United States Patent
Partovi

(10) Patent No.: US 12,272,492 B2
(45) Date of Patent: Apr. 8, 2025

(54) SYSTEM AND METHOD FOR POWERING OR CHARGING MULTIPLE RECEIVERS WIRELESSLY WITH A POWER TRANSMITTER

(71) Applicant: Mojo Mobility Inc., Palo Alto, CA (US)

(72) Inventor: Afshin Partovi, Palo Alto, CA (US)

(73) Assignee: Mojo Mobility Inc., Palo Alto, CA (US)

( * ) Notice: Subject to any disclaimer, the term of this patent is extended or adjusted under 35 U.S.C. 154(b) by 0 days.

(21) Appl. No.: 18/204,152

(22) Filed: May 31, 2023

(65) Prior Publication Data
US 2023/0326671 A1 Oct. 12, 2023

Related U.S. Application Data

(63) Continuation of application No. 13/830,161, filed on Mar. 14, 2013, now abandoned.
(Continued)

(51) Int. Cl.
*H02J 7/00* (2006.01)
*H01F 38/14* (2006.01)
(Continued)

(52) U.S. Cl.
CPC ........ *H01F 38/14* (2013.01); *H02J 7/00712* (2020.01); *H02J 7/02* (2013.01);
(Continued)

(58) Field of Classification Search
CPC ........ H02M 3/335; H02M 3/337; H02J 5/00; H02J 50/40; H02J 50/12; H02J 50/60;
(Continued)

(56) References Cited

U.S. PATENT DOCUMENTS

| | | | | |
|---|---|---|---|---|
| 5,311,973 A | * | 5/1994 | Tseng | H02J 50/70 320/108 |
| 2007/0279002 A1 | * | 12/2007 | Partovi | G06K 19/0704 320/115 |
| 2011/0222493 A1 | * | 9/2011 | Mangold | H04B 1/1027 370/329 |

OTHER PUBLICATIONS

Defendants' Invalidity Contentions, *Mojo Mobility Inc.*, Plaintiff v. *Samsung Electronics Co., Ltd.; Samsung Electronics America, Inc.,* Defendants, Civil Action No. 2:22-cv-00398-JRG-RSP, dated Apr. 25, 2023, 50 pages.

(Continued)

*Primary Examiner* — Daniel Kessie
*Assistant Examiner* — Terrence R Willoughby
(74) *Attorney, Agent, or Firm* — NK Patent Law

(57) ABSTRACT

A system and method for powering or charging multiple receivers wirelessly with a power transmitter. In accordance with an embodiment, to enable ease of use, it is desirable that the receiver can be placed on a larger surface area charger without the need for specific alignment of the position of the receiver; that the system can be used to charge or power multiple devices of similar or different power and voltage requirements or operating with different wireless charging protocols on or near the same surface; and that a degree of freedom is provided with respect to vertical distance (away from the surface of the charger) between the charger and the receivers. Such features enable improved functionality with devices, vehicles, or other products, including, for example, charging of electric vehicles (EV), and trains.

9 Claims, 16 Drawing Sheets

Related U.S. Application Data

(60) Provisional application No. 61/749,108, filed on Jan. 4, 2013.

(51) Int. Cl.
| | | |
|---|---|---|
| *H02J 7/02* | (2016.01) | |
| *H02J 50/12* | (2016.01) | |
| *H02J 50/40* | (2016.01) | |
| *H02J 50/60* | (2016.01) | |
| *H02J 50/70* | (2016.01) | |
| *H02J 50/80* | (2016.01) | |
| *H02J 50/90* | (2016.01) | |
| *H02M 3/00* | (2006.01) | |
| *H02M 3/335* | (2006.01) | |
| *H02M 1/00* | (2006.01) | |

(52) U.S. Cl.
CPC ............. *H02J 50/12* (2016.02); *H02J 50/40* (2016.02); *H02J 50/60* (2016.02); *H02J 50/70* (2016.02); *H02J 50/80* (2016.02); *H02J 50/90* (2016.02); *H02M 3/01* (2021.05); *H02M 3/33515* (2013.01); *H02M 3/33571* (2021.05); *H02M 3/33576* (2013.01); *H02M 1/0058* (2021.05); *H02M 1/0064* (2021.05); *H02M 1/007* (2021.05); *Y02T 90/12* (2013.01)

(58) Field of Classification Search
CPC .. H02J 50/70; H02J 50/80; H02J 50/90; H02J 7/02; H02J 7/025; H01F 38/14; Y02T 90/12
USPC .................................................. 307/9.1, 31
See application file for complete search history.

(56) References Cited

OTHER PUBLICATIONS

Exhibit A of Defendants' Invalidity Contentions, *Mojo Mobility Inc.*, Plaintiff v. *Samsung Electronics Co., Ltd.; Samsung Electronics America, Inc.*, Defendants, Civil Action No. 2:22-cv-00398-JRG-RSP, dated Apr. 25, 2023, 1034 pages.
Exhibit B of Defendants' Invalidity Contentions, *Mojo Mobility Inc.*, Plaintiff v. *Samsung Electronics Co., Ltd.; Samsung Electronics America, Inc.*, Defendants, Civil Action No. 2:22-cv-00398-JRG-RSP, dated Apr. 25, 2023, 1395 pages.
Exhibit C of Defendants' Invalidity Contentions, *Mojo Mobility Inc.*, Plaintiff v. *Samsung Electronics Co., Ltd.; Samsung Electronics America, Inc.*, Defendants, Civil Action No. 2:22-cv-00398-JRG-RSP, dated Apr. 25, 2023, 2336 pages.
Exhibit D of Defendants' Invalidity Contentions, *Mojo Mobility Inc.*, Plaintiff v. *Samsung Electronics Co., Ltd.; Samsung Electronics America, Inc.*, Defendants, Civil Action No. 2:22-cv-00398-JRG-RSP, dated Apr. 25, 2023, 5980 pages.
Exhibit E of Defendants' Invalidity Contentions, *Mojo Mobility Inc.*, Plaintiff v. *Samsung Electronics Co., Ltd.; Samsung Electronics America, Inc.*, Defendants, Civil Action No. 2:22-cv-00398-JRG-RSP, dated Apr. 25, 2023, 5232 pages.
Exhibit F of Defendants' Invalidity Contentions, *Mojo Mobility Inc.*, Plaintiff v. *Samsung Electronics Co., Ltd.; Samsung Electronics America, Inc.*, Defendants, Civil Action No. 2:22-cv-00398-JRG-RSP, dated Apr. 25, 2023, 751 pages.
Exhibit G of Defendants' Invalidity Contentions, *Mojo Mobility Inc.*, Plaintiff v. *Samsung Electronics Co., Ltd.; Samsung Electronics America, Inc.*, Defendants, Civil Action No. 2:22-cv-00398-JRG-RSP, dated Apr. 25, 2023, 999 pages.
Exhibit H of Defendants' Invalidity Contentions, *Mojo Mobility Inc.*, Plaintiff v. *Samsung Electronics Co., Ltd.; Samsung Electronics America, Inc.*, Defendants, Civil Action No. 2:22-cv-00398-JRG-RSP, dated Apr. 25, 2023, 4531 pages.

* cited by examiner

SYSTEM AND METHOD FOR POWERING OR CHARGING MULTIPLE RECEIVERS WIRELESSLY WITH A POWER TRANSMITTER

CLAIM OF PRIORITY

This application is a continuation of U.S. Non-Provisional patent application Ser. No. 13/830,161, entitled "SYSTEM AND METHOD FOR POWERING OR CHARGING MULTIPLE RECEIVERS WIRELESSLY WITH A POWER TRANSMITTER", which was filed on Mar. 14, 2013, which claims the benefit of priority to U.S. Provisional Patent Application titled "SYSTEM AND METHOD FOR POWERING OR CHARGING MULTIPLE RECEIVERS WIRELESSLY WITH A POWER TRANSMITTER", Application No. 61/749,108, filed Jan. 4, 2013, the entire contents of which are all hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems and methods for enabling transfer of power, from a wireless charger or power supply, to one or more receivers placed on or near the wireless charger or power supply.

CROSS-REFERENCE TO RELATED APPLICATIONS

This application is related to U.S. Patent Publication No. 20120235636 (U.S. patent application Ser. No. 13/352,096) titled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM", filed Jan. 17, 2012, which claims the benefit of priority to U.S. Provisional Patent Application No. 61/433,883, titled "SYSTEM AND METHOD FOR MODULATING THE PHASE AND AMPLITUDE OF AN ELECTROMAGNETIC WAVE IN MULTIPLE DIMENSIONS", filed Jan. 18, 2011; U.S. Provisional Patent Application No. 61/478,020, titled "SYSTEM AND METHOD FOR MODULATING THE PHASE AND AMPLITUDE OF AN ELECTROMAGNETIC WAVE IN MULTIPLE DIMENSIONS", filed Apr. 21, 2011; and U.S. Provisional Patent Application No. 61/546,316, titled "SYSTEMS AND METHODS FOR TRANSFER", filed Mar. 14, 2013, which claims the benefit of priority to U.S. Provisional Patent Application titled "SYSTEMS AND METHODS FOR PROVIDING POSITIONING FREEDOM IN THREE DIMENSIONS FOR WIRELESS POWER TRANSFER", Application No. 61/613,792, filed Mar. 21, 2012; each of which above applications are herein incorporated by reference.

BACKGROUND

Wireless technologies for powering and charging mobile and other electronic or electric devices, batteries and vehicles have been developed. Such systems generally use a wireless power charger or transmitter, and a wireless power receiver in combination, to provide a means for transfer of power. In some systems, the charger and receiver coil parts of the system are aligned and of comparable or similar size. However, such operation typically requires the user to place the device or battery to be charged in a specific location with respect to the charger. These are the general areas that embodiments of the invention are intended to address.

SUMMARY

In accordance with an embodiment, to enable ease of use, it is desirable that the receiver can be placed on a larger surface area charger without the need for specific alignment of the position of the receiver; that the system can be used to charge or power multiple devices of similar or different power and voltage requirements or operating with different wireless charging protocols on or near the same surface; and that a degree of freedom is provided with respect to vertical distance (away from the surface of the charger) between the charger and the receivers.

Such features enable improved functionality with devices, vehicles, or other products, including, for example, charging of electric vehicles (EV), and trains. Other examples include use cases wherein the charger may need to be physically separated from the device or battery to be charged, such as when a charger is incorporated beneath a surface such as the center console of a car, or under the surface of a table or desk.

In accordance with various embodiments, described herein are systems and methods of enabling efficient wireless power transfer and charging of devices and batteries with freedom of placement of the devices and batteries in one or multiple (e.g., one, two or three) dimensions. Applications include inductive or magnetic charging and power, and particularly usage in mobile, electronic, electric, lighting, or other devices, batteries, power tools, kitchen, industrial, medical or dental, or military applications, vehicles, robots, trains, and other usages. Embodiments can also be applied generally to power supplies and other power sources and chargers, including systems and methods for improved ease of use and compatibility and transfer of wireless power to mobile, electronic, electric, lighting, or other devices, batteries, power tools, kitchen, military, medical, industrial applications and/or vehicles.

DETAILED DESCRIPTION

Figure 1:
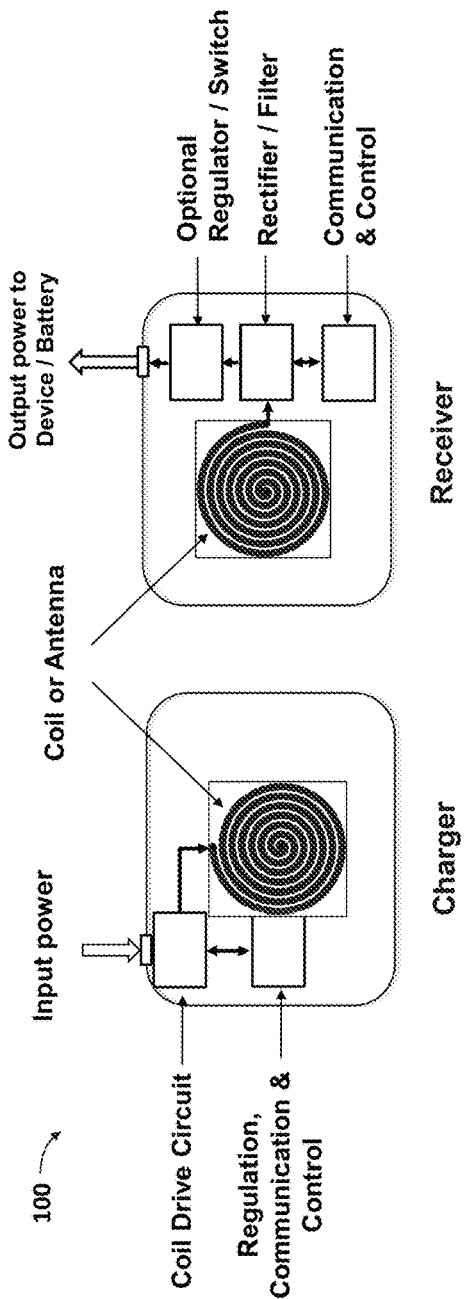
FIG. 1 illustrates a wireless charger or power system that comprises a first charger or transmitter part and a receiver connected to a mobile or stationary device, vehicle or battery or its charging circuit, in accordance with an embodiment.

With the proliferation of electrical and electronic devices and vehicles (which are considered examples of devices herein), simple and universal methods of providing power and or charging of these devices is becoming increasingly important.

In accordance with various embodiments, the term device, product, or battery is used herein to include any electrical, electronic, mobile, lighting, or other product, batteries, power tools, cleaning, industrial, kitchen, lighting, military, medical, dental or specialized products and vehicles, automobiles, personal mobility (e.g., Segway) devices, buses or movable machines such as robots or other mobile machines or other devices whereby the product, part, or component is powered by electricity or an internal or external battery and/or can be powered or charged externally or internally by a generator or solar cell, fuel cell, hand or other mechanical crank or alike.

In accordance with an embodiment, a product or device can also include an attachable or integral skin, case, battery door or attachable or add-on or dongle type of receiver component to enable the user to power or charge the product, battery, or device.

Induction is defined as generation of electromotive force (EMF) or voltage across a closed electrical path in response to a changing magnetic flux through any surface bounded by that path. Magnetic induction has sometimes been described in the context of tightly-coupled cases, whereby the charger and receiver coils are of similar sizes or the gap between them is small. Magnetic resonance is a term that has been used recently for inductive power transfer where the charger and receiver may be far apart or the transmitter and receiver coils of different size. The term loosely coupled wireless charging has also been used for these systems. Since magnetic resonance or loosely coupled wireless charging is in general a form of induction, in the remainder of this document the terms induction is used for any of these systems (including inductive or tightly coupled wireless power transfer, magnetic resonant or loosely coupled wireless power transfer and hybrid systems) and induction and magnetic resonance are sometimes used interchangeably to indicate that the method of power transfer may be in either domain or a combination thereof.

In accordance with various embodiments, an inductive power transmitter employs a magnetic induction coil(s) transmitting energy to a receiving coil(s) in or on a device or product, case, battery door, or attachable or add-on component including attachments such as a dongle or a battery inside or outside of device or attached to device through a connector and/or a wire, or stand-alone placed near the power transmitter platform. The receiver can be an otherwise incomplete device that receives power wirelessly and is intended for installation or attachment in or on the final product, battery or device to be powered or charged, or the receiver can be a complete device intended for connection to a device, product or battery directly by a wire or wirelessly. As used herein, the term wireless power, charger, transmitter or inductive or magnetic resonance power and charger are used interchangeably.

In accordance with an embodiment, the wireless charger can be a flat or curved surface or part that can provide energy wirelessly to a receiver. It can also be constructed of flexible materials and/or coils or even plastic electronics to enable mechanical flexibility and bending or folding to save space or for conformity to non-flat surfaces.

In accordance with an embodiment, the wireless charger may be directly powered by an AC power input, DC power, or other power source such as a car, motorcycle, truck or other vehicle or airplane or boat or ship power outlet, or vehicle, boat, ship or airplane itself, primary (non-rechargeable) or rechargeable battery, solar cell, fuel cell, mechanical (hand crank, wind, water source, etc.), nuclear source or other or another wireless charger or power supply or a combination thereof. In addition, the wireless charger may be powered by a part such as a rechargeable battery which is itself in turn recharged by another source such as an AC or DC power source, vehicle, boat or ship or airplane outlet or vehicle, boat or ship or airplane itself, solar cell, fuel cell, or mechanical (hand crank, wind, water, etc.) or nuclear source, etc. or a combination thereof.

In accordance with various embodiments, in cases where the wireless charger is powered by a rechargeable source such as a battery, the battery can also be itself in turn inductively charged by another wireless charger. The wireless charger can be a stand-alone part, device, or product, or may be incorporated into another electric or electronics device, table, desk chair, armrest, TV stand or mount or furniture or vehicle or airplane or marine vehicle or boat or objects such as a table, desk, chair, counter-top, shelving or check out or cashier counters, kiosk, car seat, armrest, car console, car door, netting, cup holder, dashboard, glovebox, etc., airplane tray, computer, laptop, netbook, tablet, phone, display, TV, magnetic, optical or semiconductor storage or playback device such as hard drive, solid state storage drive, optical players, etc., cable or game console, computer pads, toys, clothing, bags, case or backpack, belt or holster, etc., industrial, medical, dental, military or kitchen counter, area, devices and appliances, phones, cameras, radios, stereo systems, speakers, etc. The wireless charger may also have other functions built in, or be constructed such that it is modular and additional capabilities/functions can be added as needed.

In accordance with various embodiments, some of these capabilities/functions include an ability to provide higher power, charge more devices, exchange the top surface or exterior box or cosmetics, operate by internal power as described above through use of a battery and/or renewable source such as solar cells, communicate and/or store data from a device, provide communication between the device and other devices or the charger and/or a network, etc. An example is a basic wireless charger that has the ability to be extended to include a rechargeable battery pack to enable operation without external power. Examples of products or devices powered or charged by the induction transmitter and receiver include but are not limited to batteries, cell phones, smart phones, cordless phones, communication devices, heads-up Displays, 3-d TV glasses, display or communication glasses such as Google Glass, pagers, personal data assistants, portable media players, global positioning (GPS) devices, powered headphones or noise cancelling headphones, Bluetooth headsets and other devices, shavers, watches, tooth brushes, calculators, cameras, optical scopes, infrared viewers, computers, laptops, tablets, netbooks, keyboards, computer mice, book readers or email devices, pagers, computer monitors, televisions, music or movie players and recorders, storage devices, radios, clocks, speakers, gaming devices, game controllers, toys, remote controllers, power tools, cash register, delivery or other type of scanners, construction tools, office equipment, robots including vacuum cleaning robots, floor washing robots, pool cleaning robots, gutter cleaning robots or robots used in hospital, clean room, military or industrial environments, industrial tools, mobile vacuum cleaners, medical or dental tools, medical stretcher batteries, military equipment or tools, kitchen appliances, mixers, cookers, can openers, food or beverage heaters or coolers such as electrically powered beverage mugs, massagers, adult toys, lights or light fixtures, signs or displays, or advertising applications, electronic magazines or newspapers or magazines or newspapers containing an electronic and/or display part, printers, fax machines, scanners, electric vehicles, electric golf carts, buses, trains, motorcycles or bicycles, Segway type of devices, trains or other vehicles or mobile transportation machines, and other battery or electrically powered devices or products or a product that is a combination of the products listed above.

In accordance with an embodiment, the receiver and/or the charger can be incorporated into a bag, carrier, skin, clothing, case, packaging, product packaging or box, crate, box, display case or rack, table, bottle or device etc. to enable some function inside the bag, carrier, skin, clothing, case, packaging, product packaging or box, crate, box, display case or rack, table, bottle (such as, e.g., causing a display case or packaging to display promotional information or instructions, or to illuminate) and/or to use the bag, carrier, skin, clothing, case, packaging, product packaging or box, crate, box, stand or connector, display case or rack, table, bottle, etc., to power or charge another device or component somewhere on or nearby.

In accordance with various embodiments, the product or device does not necessarily have to be portable and/or contain a battery to take advantage of induction or wireless power transfer. For example, a lighting fixture or a computer monitor that is typically powered by an AC outlet or a DC power supply may be placed on a tabletop and receive power wirelessly. The wireless receiver may be a flat or curved surface or part that can receive energy wirelessly from a charger. The receiver and/or the charger can also be constructed of flexible materials and/or coils or even plastic electronics to enable mechanical flexibility and bending or folding to save space or for conformity to non-flat surfaces.

In accordance with various embodiments, many of these devices contain internal batteries, and the device may or may not be operating during receipt of power. Depending on the degree of charge status of the battery or its presence and the system design, the applied power may provide power to the device, charge its battery or a combination of the above. The terms charging and/or power are used interchangeably herein to indicate that the received power can be used for either of these cases or a combination thereof. In accordance with various embodiments, unless specifically described, these terms are therefore used interchangeably. Also, unless specifically described herein, in accordance with various embodiments, the terms charger power supply and transmitter are used interchangeably.

As shown in FIG. 1, in accordance with an embodiment 100, a wireless charger or power system 100 comprises a first charger or transmitter part, and a receiver connected to a mobile or stationary device, vehicle or battery or its charging circuit to provide electric power to power or charge the mobile or stationary device, vehicle or its battery.

FIG. 1 shows a case where one charger or power transmitter is charging or powering one receiver. However, in a more general case, the transmitter may comprise one or more transmitters or chargers operating at different power levels and/or using different protocols to power one or more receivers operating at different power levels, voltages and/or protocols.

Figure 2:
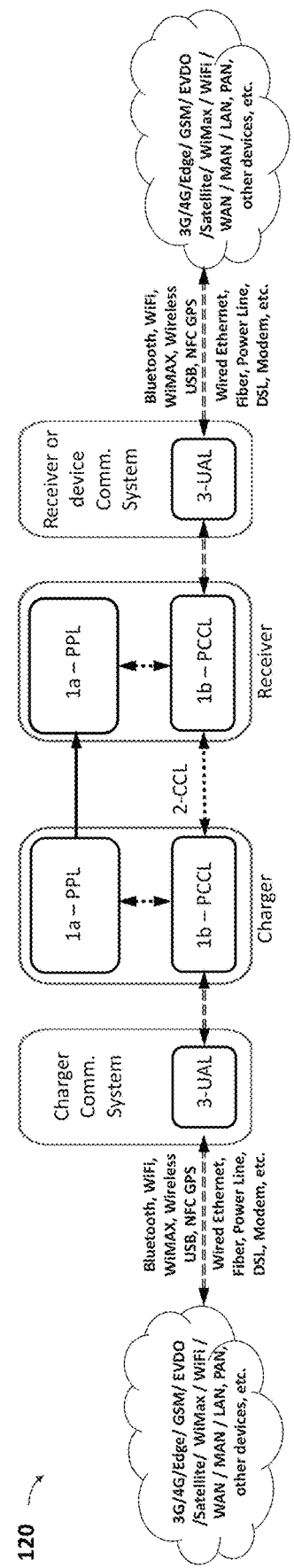
FIG. 2 illustrates an abstraction layer model for wireless power transfer systems, in accordance with an embodiment.

In accordance with an embodiment, using an analogy to the abstraction layer model used for Open Systems Interconnection (OSI) model for communication systems, a high level, generalized Wireless Power System (WPT) such as shown 120 in FIG. 2 can comprise the following layers: Physical layer (PL/PPL, PCCL)

In accordance with an embodiment, this layer comprises a plurality of sub layers, as described in further detail below.

Physical Layer (PL)/Physical Power Layer (PPL): In accordance with an embodiment, this layer comprises the device, coil, magnetic and other hardware components, systems and specifications in the transmitters or chargers and receivers that allow power to be transmitted from one or more transmitters to one or more receivers. The components and the power transmitted or distributed to the receivers are shown in solid lines and blocks in FIG. 2. In cases where the receiver includes a battery charging circuit, the PPL may extend to include the battery charging and any possible protection circuit, and provide an output power to the battery to charge it.

Physical Communication and Control Layer (PCCL): In accordance with an embodiment, this layer provides the components, hardware, systems and specifications that allow device identification, communication and control of the WPT, and any systems used to detect and interrupt power flow, such as interlock switches or alignment detectors, temperature or magnetic field detectors, charging flags, etc. For example, this layer may comprise the components and systems to allow in-band, load modulation, or out-of-band RF, optical, or other communication systems.

Command and Control Layer (CCL)

In accordance with an embodiment, this layer is the firmware and/or software and associated protocols and specifications in transmitters and/or chargers and receivers that control the charger and receiver operations and allow detection and/or identification of the receivers, control of power transmission, power regulation, end of charge actions and handling of any extraordinary or fault conditions. This layer can operate in a bi-directional or uni-directional manner between one or more chargers and receivers. In accordance with an embodiment, as shown in FIG. 2, the communication is shown as the dotted line between the PCCLs.

User Application layer (UAL)

In accordance with an embodiment, this layer provides physical, software and hardware connections, communications, control, protocols and specifications for connectivity and display or execution of additional functionality between transmitters/chargers and/or receivers and devices, systems, environments or vehicles where they are integrated or attached to. Examples may include implementations where the transmitter/charger is integrated into an electronic device (e.g., laptop or computer) and during charging may show additional information such as charging state of the receiver battery or allow the receiver to control the process. In accordance with an embodiment, as shown in FIG. 2, the communication in this layer is shown as double dotted lines between the charger/receiver or device, and the charger or receiver or external communication wired or wireless networks. In accordance with an embodiment, this layer may also include any application or apps that may run on the charger, its host device (if the charger is built into or is part of or attached to another device or vehicle), the receiver or the device being charged or powered. These applications bring extra functionality and convenience to the user.

The following section describes components of a wireless charging/power system according to the layers described above, in accordance with an embodiment.

Physical Layer (PL)/Physical Power Layer (PPL);

In accordance with an embodiment, the charger/transmitter Physical Power Layer (PPL) can generate a repetitive power signal pattern (such as a sinusoid or square wave from 10's of Hz to several MHz or even higher, but typically in the 100 kHz to several MHz range) with its coil drive circuit and a coil or antenna for transmission of the power.

The charger or transmitter typically also includes a communication and regulation/control system (Physical Communication and Control Layer, PCCL) that detects a receiver and/or turns the applied power on or off and/or modify the amount of applied power by mechanisms such as changing the amplitude, frequency or duty cycle, etc., or a change in the resonant condition by varying the impedance (capacitance or inductance) of the charger, or a combination thereof of the applied power signal to the coil or antenna.

In accordance with an embodiment, the power section (coil drive circuit and receiver power section) can be a resonant converter, resonant, full bridge, half bridge, E-class, zero voltage or current switching, flyback, or any other appropriate power supply topology.

Figure 3:
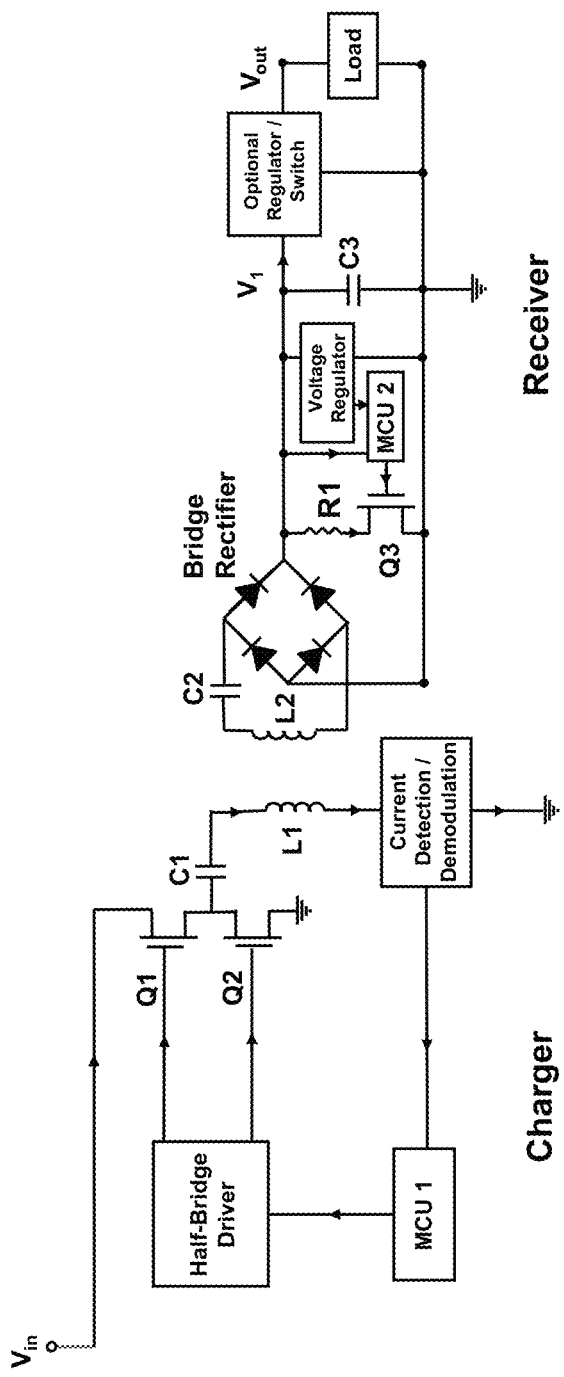
FIG. 3 illustrates a more detailed view of a wireless charger system, in accordance with an embodiment.

FIG. 3 shows a more detailed view of the wireless charger system 130 in accordance with an embodiment, with a resonant converter geometry, wherein a pair of transistors Q1 and Q2 (such as FETs, MOSFETs, or other types of switch) are driven by a half-bridge driver IC and the voltage is applied to the coil L1 through one or more capacitors shown as C1. In accordance with an embodiment, the charger can also be the whole or part of the electronics, coil, shield, or other part of the system required for transmitting power wirelessly. The electronics may comprise discrete components or microelectronics that when used together provide the wireless charger functionality, or comprise an Application Specific Integrated Circuit (ASIC) chip or chipset that is specifically designed to function as the whole or a substantial part of the electronics for wireless charger system. It may also comprise Multi-Chip Modules (MCM) that comprise bare ICs that are combined and connected onto a single larger integrated package to decrease the footprint and cost of the overall circuit and/or increase its reliability.

In accordance with an embodiment, as shown in FIG. 3, the second part of the PPL system is a receiver that includes a coil or antenna to receive power, a method for change of the received AC voltage to DC voltage, such as rectification and smoothing with one or more rectifiers or a bridge or synchronous rectifier, etc. and one or more capacitors.

In cases where the voltage at the load does not need to be kept within a tight tolerance or can vary regardless of the load resistance or the resistance of the load is always constant, the rectified and smoothed output of the receiver can be directly connected to a load.

Examples of this embodiment may be in lighting applications, applications where the load is a constant resistance such as a heater or resistor or thermoelectric or Peltier element, etc. In these cases, the receiver system can be quite simple and inexpensive.

In many other cases, the resistance or impedance of the load changes during operation. This includes cases where the receiver is connected to a device whose power needs may change during operation or when the receiver is used to charge a battery. In these cases, the output voltage may need to be regulated so that it stays within a range or tolerance during the variety of operating conditions. In these cases, the receiver may optionally include a DC to DC converter or regulator such as a linear, switching, buck, boost or buck/boost, etc. regulator and/or switch for the output power. The receiver may also include a switch between the DC output of the receiver coil and the rectification and smoothing stage $V_1$ and its output or a switch between the output of the regulator stage to a device or battery or a device case or skin or a device to be charged or battery.

In cases where the receiver is used to charge a battery or device, the receiver may also include a regulator, battery charger IC or circuitry and/or battery protection circuit and associated transistors, etc. In addition, the receiver may include a switch to allow switching between a wired and wireless method of charging or powering a device or its battery.

In accordance with an embodiment, the receiver may optionally include a reactive component (inductor or capacitor) in parallel or in series with the receiver coil to increase the resonance of the system. Effect of such a resonance becomes more important as the coils are operated farther from each other or a mismatched size for the receiver and the charger/transmitter coil is used. In such conditions where low coupling coefficient is used, the importance of the resonance in the receiver is more significant. An example of a low coupling coefficient system may be when a larger size charger coil and smaller receiver coils are used. Such an optional capacitor is shown as C2 in FIG. 3 and may be in series or in parallel with the receiver coil L2. The charger and/or receiver coils may also include impedance matching circuits and/or appropriate magnetic material layers behind (on the side opposite to the coil surfaces facing each other) them to increase their inductance and/or to shield the magnetic field leakage to surrounding area or to guide the magnetic field appropriately.

In many of the embodiments and figures described herein, the resonant capacitor C2 in the receiver is shown in a series architecture. This is intended only as a representative illustration, and in accordance with various embodiments this capacitor may be used in series or parallel with the receiver coil. Similarly, the charger is generally shown in an architecture where the resonant capacitor is in series with the coil. System architectures where the capacitor C1 is in parallel with the charger coil are also possible.

In accordance with an embodiment, one method of controlling the amount of received power in the receiver in such low coupling coefficients is to include variable or switchable reactive components (capacitors and/or inductors) in parallel or series with the receiver coil whereby tuning these elements would allow the receiver to change its resonant condition to affect the amount of power delivered to the device, load or battery.

In accordance with an embodiment, the charger or transmitter coil and the receiver coil can have any shape desired and may be constructed of PCB, wire, Litz wire, or a combination thereof.

To reduce resistance, the coils can be constructed of multiple parallel tracks or wires in multiple layers of the PCB and/or wire construction. For PCB construction, the multiple layers can be in different sides of a PCB and/or different layers and layered/designed appropriately to provide optimum field pattern, uniformity, inductance, and/or resistance or Quality factor (Q) for the coil. Various materials can be used for the coil conductor such as different metals and/or magnetic material or plastic conductors, etc. Typically, copper with low resistivity may be used but other conductive materials usage is also possible. The design should also take into account the skin effect of the material used at the frequency of operation to preferably provide low resistance.

In accordance with an embodiment, the receiver can be an integral part of a device or battery as described above, or can be an otherwise incomplete device that receives power wirelessly and is intended for installation or attachment in or on the final product, battery or device to be powered or charged, or the receiver can be a complete device intended for connection to a device, product or battery directly by a wire or wirelessly. Examples include replaceable covers, skins, cases, doors, jackets, surfaces, etc. for devices or batteries that would incorporate the receiver or part of the receiver and the received power would be directed to the device through connectors in or on the device or battery or the normal wired connector (or power jack) of the device or battery. The receiver may also be a part or device similar to a dongle or insert etc. that can receive power on or near the vicinity of a charger and direct the power to a device or battery to be charged or powered through a wire and/or appropriate connector. Such a receiver may also have a form factor that would allow it to be attached in an inconspicuous manner to the device such as a part that is attached to the outer surface at the bottom, front, side, or back side of a laptop, netbook, tablet, phone, game player, camera, headset or other electronic device and route the received power to the input power connector, battery connector or jack of the device.

In accordance with an embodiment, the connector of such a receiver may be designed such that it has a pass through or a separate connector integrated into it so that a wire cable for providing wired charging/power or communication can be connected to the connector without removal of the connector thus allowing the receiver and its connector to be permanently or semi-permanently be attached to the device throughout its operation and use.

In a more integrated approach, the coil, shield and/or the receiver circuit may be integrated into the construction of the electric or electronic device and be an integral part of the operation of the device which is powered or charged primarily or as an option (in addition to wired charging) through the wireless power received from the receiver. Many other variations of the receiver implementation are possible and these examples are not meant to be exhaustive.

In accordance with an embodiment, the receiver can also be the whole or part of the electronics, coil, shield, or other part of the system required for receiving power wirelessly. The electronics may comprise discrete components or microcontrollers that when used together provide the wireless receiver functionality, or comprise an Application Specific Integrated Circuit (ASIC) chip or chipset or MCM that is specifically designed to function as the whole or a substantial part of the electronics for wireless receiver system.

Figure 4:
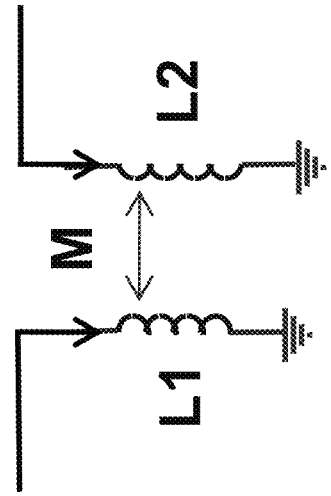
FIG. 4 illustrates how charger and receiver coils can be represented by their respective inductances, in accordance with an embodiment.

In accordance with an embodiment, in any of the systems described above, as shown 140 in FIG. 4, the charger and receiver coils can be represented by their respective inductances by themselves (L1 and L2) and the mutual inductance between them M which is dependent on the material between the two coils and their position with respect to each other in x, y, and z dimensions. The coupling coefficient between the coils k is given by:

$$k=M/(L1*L2)^{1/2}$$

The coupling coefficient is a measure of how closely the two coils are coupled and may range from 0 (no coupling) to 1 (very tight coupling). In coils with small overlap, large gap between coils or dissimilar coils (in size, number of turns, coil winding or pattern overlap, etc.), this value can be smaller than 1.

In many cases, for the systems described above, the transmitter and receiver coils may be of similar, although not necessarily same sizes and are generally aligned laterally to be able to transfer power efficiently. For coils of similar size, this would typically require the user to place the device and/or receiver close to alignment with respect to the transmitter coil.

For example, for a transmitter/receiver coil of 30 mm diameter, this would require lateral (x,y) positioning within 30 mm or less so there is some degree of overlap between the coils. In practice, a considerable degree of overlap is necessary to achieve high output powers and efficiencies. This may be achieved by providing mechanical or other mechanisms such as indentations, protrusions, walls, holders, fasteners, etc. to align the parts.

However for a universal charger/power supply to be useful for charging or powering a range of devices, a design able to accept any device and receiver is desirable. For this reason, in accordance with an embodiment, a flat or somewhat curved charger/power supply surface that can be used with any type of receiver may be used. To achieve alignment in this case, markings, small protrusions or indentations and/or audio and/or visual aids or similar methods can be used. Another method includes using magnets, or magnet(s) and magnetic or ferrite magnetic attractor material(s) that can be attracted to a magnet in the transmitter/charger and receiver. In these methods, typically a single charger/transmitter and receiver are in close proximity and aligned to each other.

For even greater ease of use, it may be desirable to be able to place the device to be charged/powered over a larger area, without requiring precise alignment of coils.

Several other methods that address the topic of position independence have been described previously. For example, as described in U.S. Patent Publication No. 20070182367 and U.S. Patent Publication No. 20090096413, both of which applications are herein incorporated by reference, an embodiment comprising multiple transmitter coils arranged in a two-dimensional array to cover and fill the transmitter surface is described. When a receiver is placed on the surface of such a coil array, the transmitter coil with the largest degree of overlap with the receiver is detected and activated to allow optimum power transmission and position independent operation.

In another architecture, each transmitter (or charger) coil center includes a sensor inductor (for example, E. Waffenschmidt, and Toine Staring, 13th European Conference on Power Electronics and Applications, Barcelona, 2009. EPE '09. pp. 1-10). The receiver coil includes a soft magnetic shield material that shifts the resonance frequency response of the system and can be sensed by a sensor in the transmitter to switch the appropriate coil on. The drawback of this system is that three layers of overlapping coils with a sensor and detection circuit at the center of each is required, adding to the complexity and cost of the system.

Other variations of the above or a combination of techniques can be used to detect the appropriate transmitter coil.

In accordance with other embodiments, described in U.S. Patent Publication No. 20070182367 and U.S. Patent Publication No. 20090096413, the charger/power supply may contain one or more transmitter coils that are suspended and free to move laterally in the X-Y plane behind the top surface of the charger/power supply. When a receiver coil is placed on the charger/power supply, the closest transmitter coil would move laterally to position itself to be under and aligned with the receiver coil. In general the systems above describe the use of coils that are of similar size/shape and in relatively close proximity to create a wireless power system.

As described above, the coupling coefficient k is an important factor in design of the wireless power system. In general, wireless power systems can be categorized into two types. One category which is called tightly coupled operates in a parameter space where the k value is typically 0.5 or larger. This type of system is characterized by coils that are typically similar in size and/or spatially close together in distance (z axis) and with good lateral (x,y) overlap. This so-called tightly coupled system is typically associated with high power transfer efficiencies defined here as the ratio of output power from the receiver coil to input power to transmitter coil. The methods described above for position independent operation (array of transmitter coils and moving coils), typically may use tightly coupled coils.

In contrast, for coils of dissimilar size or design or larger transmitter to receiver distance or smaller lateral coil overlap, the system coupling coefficient is lower. Another important parameter, the quality factor of a transmitter (tx) and receiver (rx) coil is defined as:

$Q_{tx}=2\pi f L_{tx}/R_{tx}$ $Q_{rx}=2\pi f L_{rx}/R_{rx}$ where f is the frequency of operation, $L_{tx}$ and $L_{rx}$ the inductances of the transmitter and receiver coils and $R_{tx}$ and $R_{rx}$ their respective resistances. The system quality factor can be calculated as follows:

$Q=(Q_{tx}*Q_{rx})^{1/2}$

In general, the loosely coupled systems may have smaller power transfer efficiencies. However, it can be shown (see for example, E. Waffenschmidt, and Toine Staring, 13th European Conference on Power Electronics and Applications, Barcelona, 2009. EPE '09. pp. 1-10) that an increase of Q can compensate for smaller k values, and reasonable or similar power transfer efficiencies can be obtained. Such systems with dissimilar coil sizes and higher Q values are sometimes referred to as Resonant Coupled or Resonant systems. However, resonance is also often used in the case of similar-size coil systems. Others, (such as Andre Kurs, Aristeidis Karalis, Robert Moffatt, J. D. Joannopoulos, Peter Fisher, and Marin Soljac, Science, 317, P. 83-86, 2007; and http://newsroom.intel.com/docs/DOC-1119) have shown that with systems with k of <0.2 due to large distance between coils (up to 225 cm), sizeable reported power transfer efficiencies of 40%-70% can be obtained. Other types of loosely coupled system appear to use mis-matched coils where the transmitter coil is much larger than the receiver coil (see for example, J. J. Casanova, Z. N. Low, J. Lin, and Ryan Tseng, in Proceedings of Radio Wireless Symposium, 2009, pp. 530-533 and J. J. Casanova, Z. N. Low, and J. Lin, IEEE Transactions on Circuits and Systems—II: Express Briefs, Vol. 56, No. 11, November 2009, pp. 830-834 and a Fujitsu System described at http://www.fujitsu.com/global/news/pr/archives/month/2010/20100913-02.html).

Some references (e.g., U.S. Pat. Nos. 6,906,495, 7,239,110, 7,248,017, and 7,042,196) describe a loosely coupled system for charging multiple devices whereby a magnetic field parallel to the plane of the charger is used. In this case, the receiver contains a coil that is typically wrapped around a magnetic material such as a rectangular thin sheet and has an axis parallel to the plane of the charger. To allow the charger to operate with the receiver rotated to any angle, two sets of coils creating magnetic fields parallel to the plane of the charger at 90 degrees to each other and driven out of phase are used.

Such systems may have a larger transmitter coil and a smaller receiver coil and operate with a small k value (possibly between 0 and 0.5 depending on coil size mismatch and gap between coils/offset of coils). The opposite case of a small transmitter coil and larger receiver coil is also possible.

Figure 5:
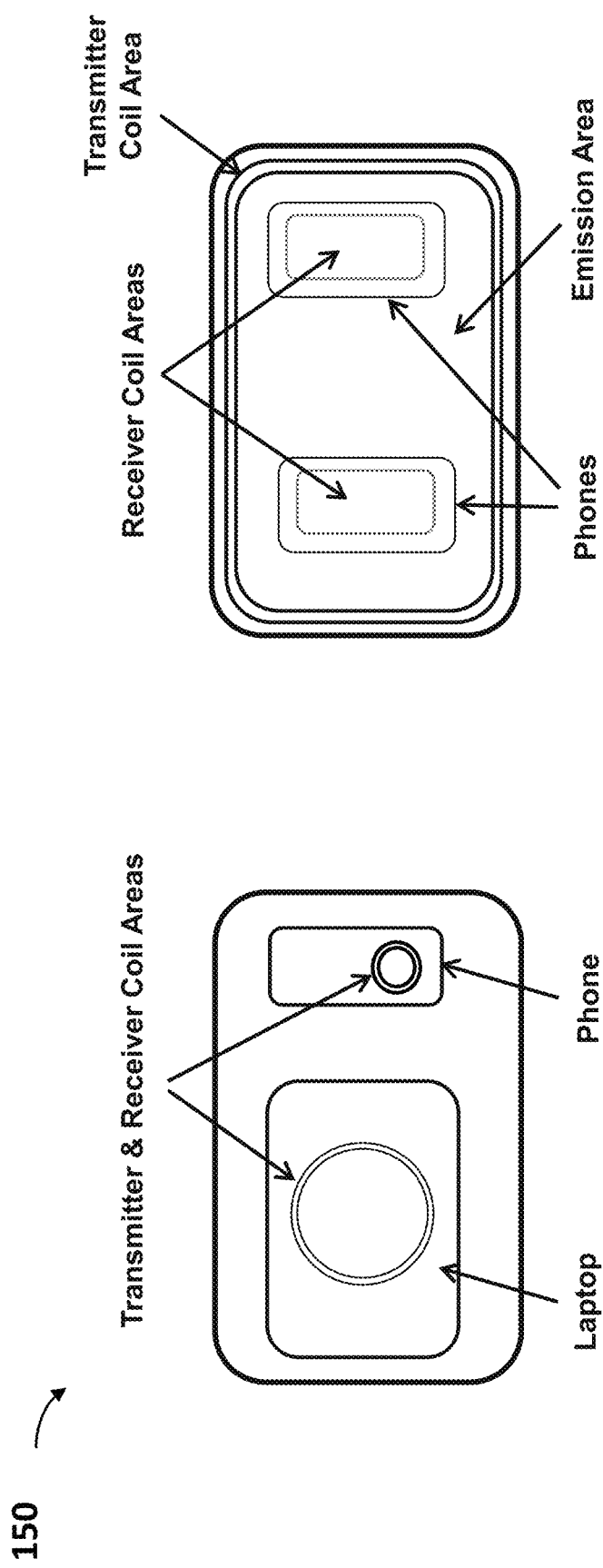
FIG. 5 illustrates on the left configurations of a tightly-coupled power transfer system with two individual transmitter coils of different size, and on the right configurations of a loosely-coupled (magnetic resonance) power transfer system with a single individual transmitter coil, in accordance with an embodiment.

FIG. 5 shows configurations 150 for a tightly coupled power transfer system, in accordance with an embodiment, with two individual transmitter coils of different size powering a laptop and a phone (left) and a loosely coupled wireless power system with a large transmitter coil powering two smaller receiver coils in mobile phones (right).

An ideal system with largely mis-matched (i.e. dissimilar in size/shape) coils can potentially have several advantages: Power can be transferred to the receiver coils placed anywhere on the transmitter coil. Several receivers can be placed and powered on one transmitter allowing for simpler and lower cost of transmitter. The system with higher Q can be designed so the gap between the transmitter and receiver coil can be larger than a tightly coupled system leading to design of systems with more design freedom. In practice, power transfer in distances of several cm or even higher have been demonstrated. Power can be transferred to multiple receivers simultaneously. In addition, the receivers can potentially be of differing power rating or be in different stages of charging or require different power levels and/or voltages.

In order to achieve the above characteristics and to achieve high power transfer efficiency, the lower k value is compensated by using a higher Q through design of lower resistance coils, etc. The power transfer characteristics of these systems may differ from tightly coupled systems and other power drive geometries such as class E amplifier or Zero Voltage Switching (ZVS) or Zero Current Switching (ZCS) or other power transfer systems may operate more efficiently in these situations. In additions, impedance matching circuits at the charger/transmitter and/or receiver may be required to enable these systems to provide power over a range of load values and output current conditions. General operation of the systems can, however be quite similar to the tightly coupled systems and one or more capacitors in series or parallel with the transmitter and/or receiver coil is used to create a tuned circuit that may have a resonance for power transfer. Operating near this resonance point, efficient power transfer across from the transmitter to the receiver coil can be achieved. Depending on the size difference between the coils and operating points, efficiencies of over 50% up to near 80% have been reported.

To provide more uniform power transfer across a coil, methods to provide a more uniform magnetic field across a coil can be used. One method for achieving this uses a hybrid coil comprising a combination of a wire and PCB coils (see, for example, X. Liu and S. Y. R. Hui, "Optimal design of a hybrid winding structure for planar contactless battery charging platform," IEEE Transactions on Power Electronics, vol. 23, no. 1, pp. 455-463, 2008). In another method, the transmitter coil is constructed of Litz wire and has a pattern that is very wide between successive turns at the center and is more tightly wound as one gets closer to the edges (see, for example, J. J. Casanova, Z. N. Low, J. Lin, and R. Tseng, "Transmitting coil achieving uniform magnetic field distribution for planar wireless power transfer system," in Proceedings of the IEEE Radio and Wireless Symposium, pp. 530-533, January 2009). In a geometry described in U.S. Patent Publication No. 20080067874, which application is herein incorporated by reference, a planar spiral inductor coil is demonstrated, wherein the width of the inductor's trace becomes wider as the trace spirals toward the center of the coil to achieve a more uniform magnetic field allowing more positioning flexibility for a receiver across a transmitter surface. In yet other embodiments (F. Sato, et al., IEEE Digest of Intermag 1999, PP. GR09, 1999), the coil can be a meandering type of coil wherein the wire is stretched along X direction and then folds back and makes a back and forth pattern to cover the surface.

In accordance with an embodiment, the charger can operate continuously, and any receiver placed on or near its surface will bring it to resonance and will begin receiving power. The regulation of power to the output can be performed through a regulation stage at the receiver. Advantages of such a system include that multiple receivers with different power needs can be simultaneously powered in this way. The receivers may also have different output voltage characteristics. To achieve this, the number of turns on the receiver coil can be changed to achieve different receiver output voltages. Without any receivers nearby, such a charger would not be in resonance and would draw minimal power. At end of charge, the receiver can include a switch that will detect the minimal current draw by a device connected to the receiver, and disconnect the output altogether and/or disconnect the receiver coil so that the receiver is no longer drawing power. This will bring the charger out of resonance and minimal input current is drawn at this stage.

In accordance with an embodiment, in a practical system, in addition to the power transfer and communication system, appropriate electromagnetic shielding of the transmitter and receiver is necessary and may be similar or different to the tightly coupled systems.

The ratio of the size of the transmitter coil to the receiver coil may be decided depending on design considerations such as the desired number of receivers to be powered/charged at any given time, the degree of positioning freedom needed, the physical size of device being charged/powered, etc. In the case that the transmitter coil is designed to be of a size to accommodate one receiver at a time, the transmitter and receiver coils may be of similar size thereby bringing the loosely coupled system to the tightly coupled limit in this case.

While the loosely coupled system may have distinct advantages and in some ways may overcome the complexities of the multiple coil/moving coil systems employed in tightly coupled systems to achieve position independence, traditional systems suffer from 2 significant problems: Since a large area transmitter coil and smaller receiver coil may be used, Electromagnetic emission in areas of the transmitter coil not covered by the receiver coil is present. This emission is in the near field and drops rapidly away from the coil. Nevertheless, it can have adverse effects on devices and/or people in the vicinity of the transmitter. A substantial amount of power from the transmitter may be lost from the area that is not physically covered by the receiver coil leading to lower efficiencies and wastage of power. It is therefore desired to benefit from the advantages of a loosely coupled system while minimizing or avoiding problems related to it.

In accordance with embodiments described in U.S. patent application Ser. No. 13/352,096, published as U.S. Patent Publication No. US20120235636, which application is herein incorporated by reference, two techniques have been described whereby through appropriate design of the system, a position-independent power transfer system with reduced or no undesirable radiation and high efficiency can be achieved. These geometries use a saturable magnetic layer placed above the charger coil area to shield the charger magnetic layer from the surrounding area. For example, in accordance with an embodiment, a Magnetic Aperture (MA) receiver includes an appropriate magnet in the receiver that can saturate the shield layer nearby the receiver and allow coupling of power only in that area of the charger resulting in efficient power coupling with minimal residual electromagnetic emission from nearby areas. In accordance with an embodiment, a Magnetic Coupling (MC) system employs a similar geometry but uses the increase in the resonant Electromagnetic filed between the charger and receiver coils to self-saturate the layer and does not require a receiver magnet to operate and achieve similar results. These two techniques are further described in the previously filed and incorporated herein patent applications referenced above.

Figure 6:
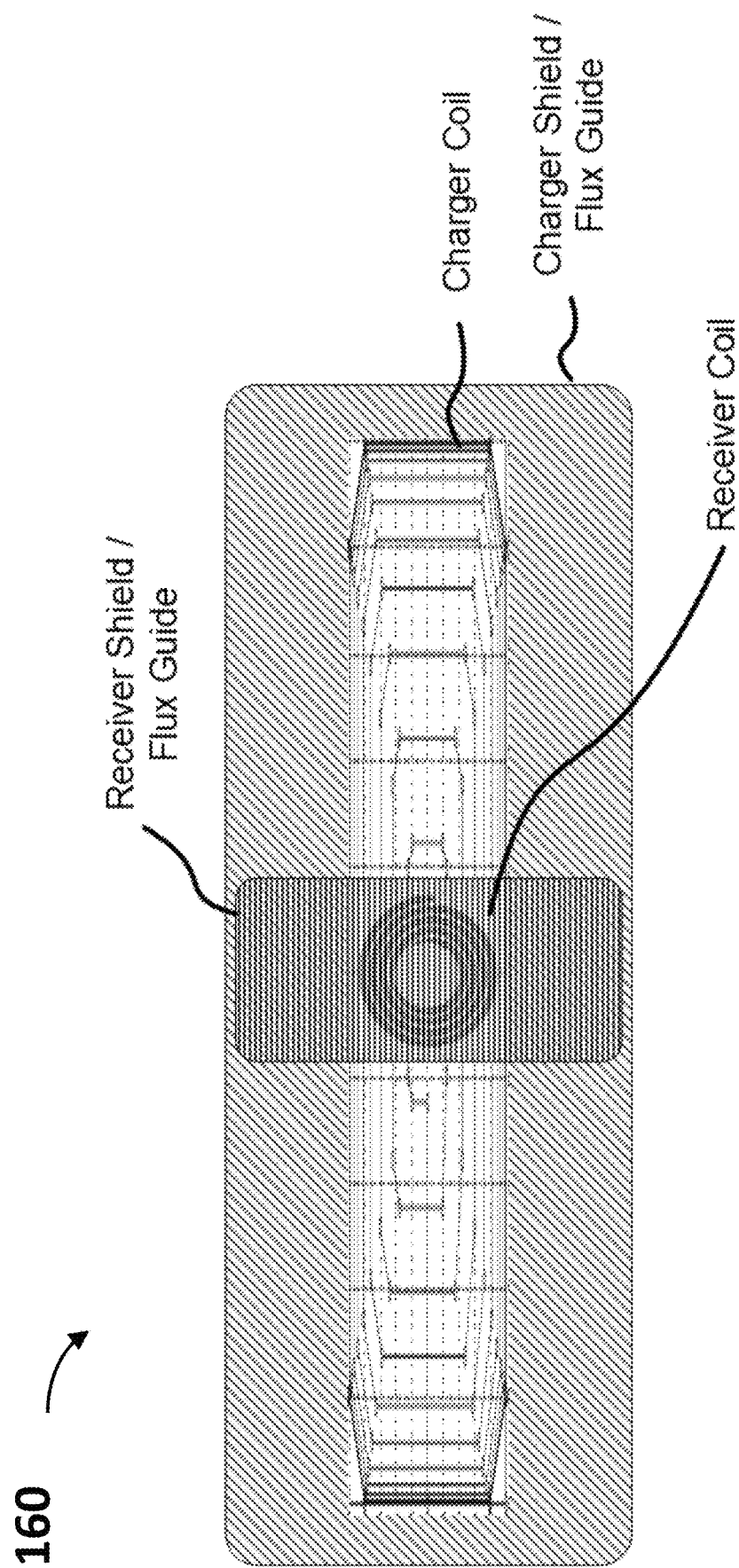
FIG. 6 illustrates an additional geometry whereby a charger coil is placed on a magnetic flux guide/shielding layer that extends beyond the edges of the coil, in accordance with an embodiment.
Figure 7:
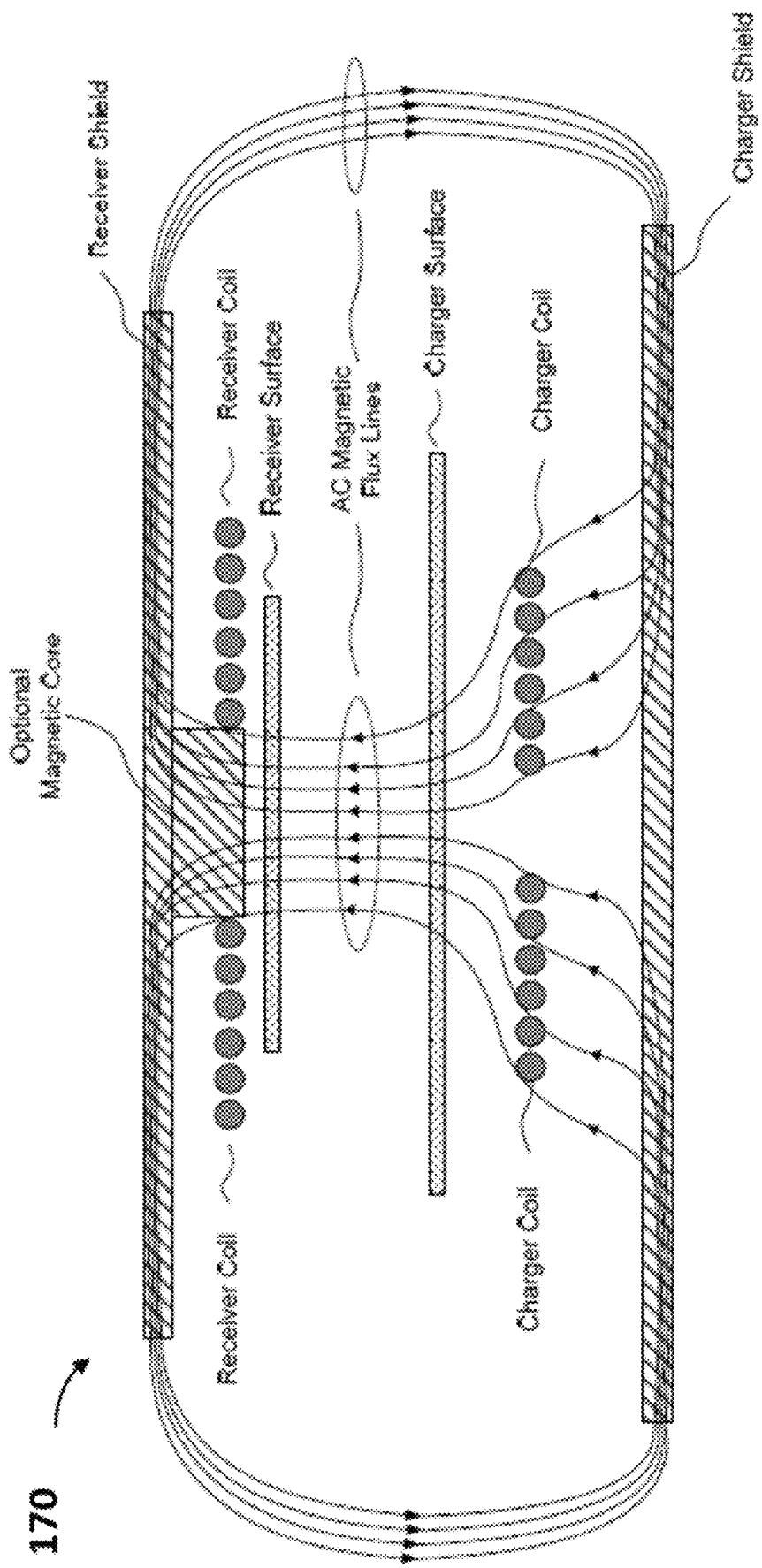
FIG. 7 illustrates a return magnetic flux from the charger, in accordance with an embodiment.

FIG. 6 shows an additional geometry 160 whereby a charger coil is placed on a magnetic flux guide/shielding layer that extends beyond the edges of the coil. The receiver similarly has a magnetic flux/shielding layer that extends beyond the size of the coil allowing an overlap area between these flux layers on the top and bottom sides of the receiver. FIG. 7 shows the return magnetic flux from the charger that passes the receiver coil and is guided efficiently to close on itself. Such an efficient Flux Guide (FG) geometry results in confinement of power transfer to the area of overlap of a receiver and charger coil and significant increase in power transfer efficiency and reduction of undesirable electromagnetic emission compared to Magnetic Resonance (MR) systems. It is also possible to further decrease any potential emissions from non-covered areas of the charger coil by covering the charger coil with a magnetic shield layer and combining the FG geometry with the earlier described MC or MA modes of operation.

In accordance with an embodiment to further facilitate coupling of the magnetic field to the receiver coil(s), the receiver system may incorporate an additional magnetic material in the center of the receiver coil such as shown 170 in FIG. 7. This component may comprise the same or different material that is used behind the receiver coil and its properties may be optimized for its particular use. As an example, solid or flexible Ferrite material with a desirable permeability can be incorporated. The core may only have the thickness of the PCB or Litz wire receiver coil, and as such may have thickness of several tenths of millimeter and be of minimal thickness and weight. However incorporation of this core to the receiver coil may affect the receiver coil inductance, and considerably affect the efficiency and power handling capability of the system.

FIG. 7 shows the incorporation of a magnetic core to the central area of a Flux Guide system, in accordance with an embodiment. In accordance with other embodiments, the magnetic core can be added to the MR, MC, and MA receiver systems described earlier to similarly enhance their performance.

In accordance with an embodiment, described herein are systems and methods for enabling charging or powering multiple receivers as shown on the right in FIG. 5, where the communication between receivers and a single charger circuit occurs in a protocol and method similar to the single charger described above.

Examples of such a system include where a single charger coil is used to deliver power to multiple receivers in all or part of a charger. For example, a system such as a loosely coupled or magnetic resonant, Magnetic Aperture (MA) or Magnetic Coupling (MC), Flux guiding (FG), or any combination of the above can be designed such that a single charger coil and/or circuit powers all or a part of the charger and designed to power multiple receivers. In general, such a system can be considered a broadcast system, as shown 180 in FIG. 8 on the left, where one charger sends power to one or several similar receivers and includes appropriate communication and control mechanism to provide the appropriate power to all the receivers and be able to respond to end of charge or metal detection, over-temperature or any other fault commands from any receivers. In a variation, shown on the right of FIG. 8, the receivers may require different power levels, voltages and/or use different protocols.

Physical Communication & Control Layer (PCCL)/Command & Control Layer (CCL);

To provide Communication and Control between the charger and receiver or receivers, in accordance with an embodiment, a hardware Physical Communication and Control Layer (Layer 1b: PCCL) and a software/firmware Command and Control Layer (Layer 2: CCL) can be implemented. Optional methods of communication between the charger and receiver(s) can be provided through the same coils as used for transfer of power, through a separate coil, through an RF or optical link, through RFID, Bluetooth, Wi-Fi, Wireless USB, NFC, Felica, Zigbee, Wireless Gigabit (WiGig), 3G, 4G, etc. or through such protocols as defined by the Wireless Power Consortium (WPC) or Alliance for Wireless Power (A4WP) or other protocols such as Dedicated Short Range Communication (DSRC) used for automotive applications or other standards, developed for wireless power, or other communication protocol, or combination thereof.

In simpler architectures, there may be minimal or no communication between the charger and receiver. For example, a charger can be designed to be in a standby power transmitting state, and any receiver in close proximity to it can receive power from the charger. The voltage, power, or current requirements of the device or battery connected to the receiver circuit can be unregulated, or regulated or controlled completely at the receiver or by the device attached to it. In this instance, no regulation or communication between the charger and receiver may be necessary. In a variation of this, the charger may be designed to be in a state where a receiver in close proximity would bring it into a state of power transmission. Examples of this would be a resonant system where inductive and/or capacitive components are used, so that when a receiver of appropriate design is in proximity to a charger, power is transmitted from the charger to a receiver; but without the presence of a receiver, minimal or no power is transmitted from the charger.

In the case that communication is provided through the power transfer coils, one method for communication from receiver or receivers to the charger is to modulate a load or impedance in the receiver to affect the voltage and/or current in the receiver coils and therefore create a modulation in the charger coil voltage or current parameters that can be detected through monitoring of its voltage or current. Other methods can include frequency modulation by combining the received frequency with a local oscillator signal or inductive, capacitive, or resistive modulation of the output of the receiver coil. In addition to communication from receivers to a charger/transmitter, it is also possible to modulate the charger voltage at a pre-determined frequency and communication protocol and detect at each receiver to provide communication from the charger to the receivers. Such bi-directional communication may be advantageous in cases where the charger is used to power multiple receivers as will be explained later.

In accordance with an embodiment, the communicated information from a receiver to the charger/transmitter can be the output voltage, current, power, device or battery status, validation ID for receiver, end of charge or various charge status information, receiver battery, device, or coil temperature, and/or user data such as music, email, voice, photos or video, or other form of digital or analog data used in a device. It can also be patterns or signals or changes in the circuit conditions that are transmitted or occur to simply notify the presence of the receiver nearby.

In accordance with an embodiment, the data communicated can be any one or more of the information detailed herein, or the difference between these values and the desired value or simple commands to increase or decrease power or simply one or more signals that would confirm presence of a receiver or a combination of the above. The receiver and/or charger and/or their coils can also include elements such as thermistors, magnetic shields or magnetic cores, magnetic sensors, and input voltage filters, etc. for safety and/or emission compliance reasons. The receiver may also be combined with other communication or storage functions such as NFC, Wi-Fi, Bluetooth, etc. In addition, the charger and or receiver can include means to provide more precise alignment between the charger and receiver coils or antennas. These can include visual, physical, or magnetic means to assist the user in alignment of parts. To implement more positioning freedom of the receiver on the charger, the size of the coils can also be mismatched. For example, the charger can comprise a larger coil size and the receiver a smaller one or vice versa, so that the coils do not have to be precisely aligned for power transfer.

In accordance with an embodiment, to minimize stand-by power use, the charger can periodically be turned on to be driven with a periodic pattern (a ping process) and if a receiver in proximity begins to draw power from it, the charger can detect power being drawn from it and would stay in a transmitting state. If no power is drawn during the ping process, the charger can be turned off or placed in a stand-by or hibernation mode to conserve power and turned on and off again periodically to continue seeking a receiver.

Figure 9:
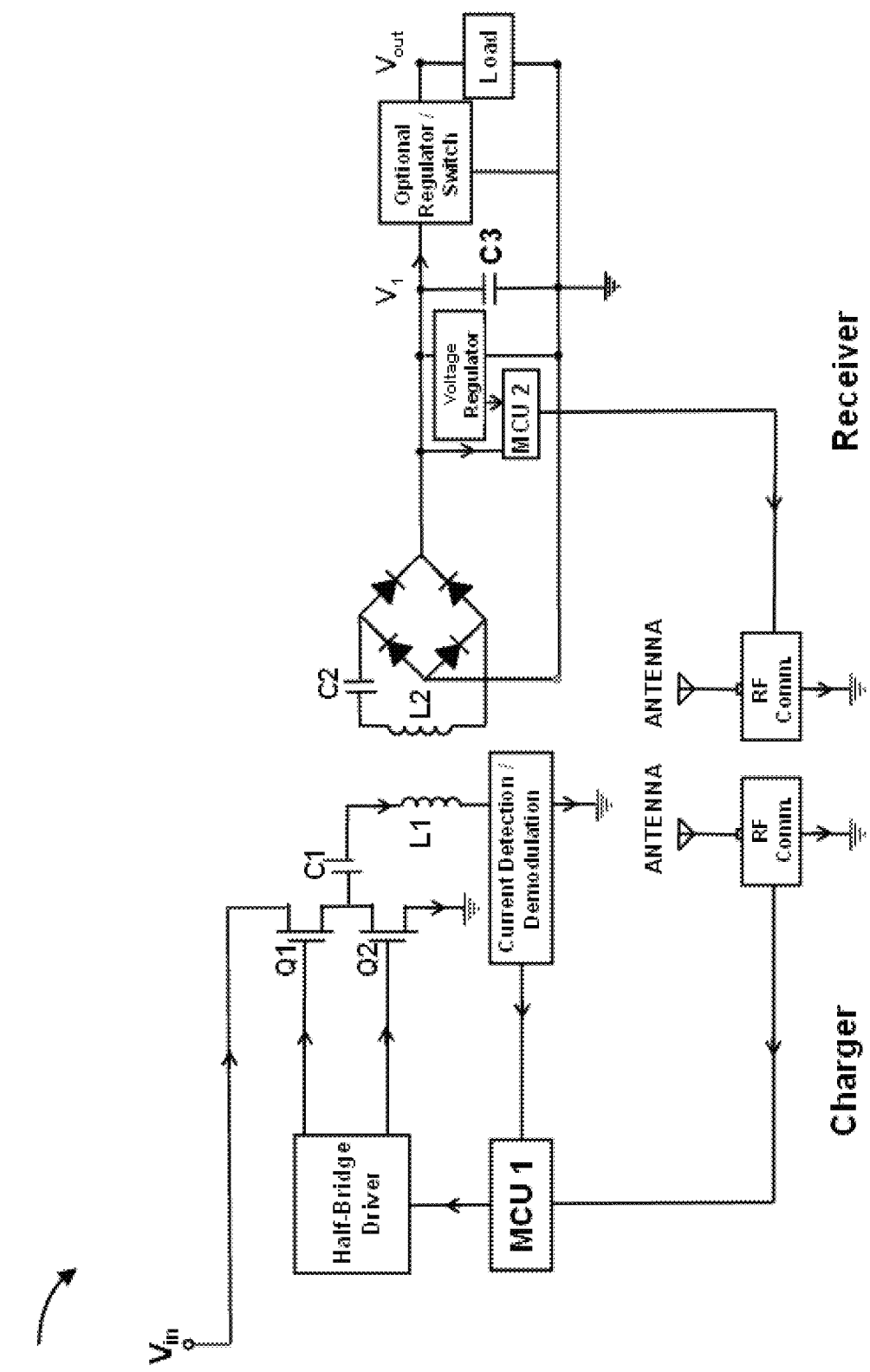
FIG. 9 illustrates a system using a dedicated RF communication channel, in accordance with an embodiment.

In accordance with an embodiment, the charger also includes a circuit that measures the current through and/or voltage across the charger coil (in this case a current sensor is shown in FIGS. 3 & 9 by way of example). Various demodulation methods for detection of the communication signal on the charger current or voltage are available. This demodulation mechanism can be, for example, an AM or FM receiver (depending on whether amplitude or frequency modulation is employed in the receiver modulator) similar to a radio receiver tuned to the frequency of the communication or a heterodyne detector, etc.

While a system for communication between the charger and receiver through the power transfer coils or antennas is described above, in accordance with an embodiment the communication can also be implemented through separate coil or coils, a radio frequency link (am or fm or other communication method), an optical communication system or a combination of the above. The communication in any of these methods can also be bi-directional rather than uni-directional as described above.

As an example, FIG. 9 shows a system 190 in accordance with an embodiment, wherein a dedicated RF channel for uni-directional or bi-directional communication between the charger and receiver is implemented for validation and/or regulation purposes. This system is similar to the system shown in FIG. 3, except rather than load modulation being the method of communication, the Microcontroller (MCU) in the receiver transmits the required information over an RF communication path. A similar system with LED or laser transceivers or detectors and light sources can be implemented. Advantages of such a system include that the power received is not modulated and therefore not wasted during communication and/or that no noise due to the modulation is added to the system.

In accordance with an embodiment, the microcontroller unit (MCU) in the charger (MCU1) is responsible for recognizing and understanding the communication signal from the detection/demodulation circuit and, depending on the algorithm used, making appropriate adjustments to the charger coil drive circuitry to achieve the desired output voltage, current or power from the receiver output. In addition, MCU1 is responsible for processes such as periodic start of the charger to seek a receiver at the start of charge, keeping the charger on when a receiver is found and accepted as a valid receiver, continuing to apply power and making appropriate adjustments, and/or monitoring temperature or other environmental factors, providing audio or visual indications to the user on the status of charging or power process, etc. or terminating charging or application of power due to end of charge or customer preference or over temperature, over current, over voltage, or some other fault condition or to launch or start another program or process.

In accordance with an embodiment, once the charger MCU1 has received a signal and decoded it, it can take action to provide more or less power to the charger coil. This can be accomplished through known methods of adjusting the frequency, duty cycle or input voltage to the charger coil or a combination of these approaches. Depending on the system and the circuit used, the MCU1 can directly adjust the bridge driver, or an additional circuit such as a frequency oscillator may be used to drive the bridge driver or the FETs.

A typical circuit for the receiver, in accordance with a load modulation communication system embodiment, is shown in FIG. 3.

In accordance with an embodiment, the receiver circuit can include an optional capacitor C2 in parallel or series with the receiver coil to produce a tuned receiver circuit. This circuit is known to increase the efficiency of a wireless power system. The rectified and smoothed (through rectifiers and capacitors) output of the receiver coil and optional capacitor is either directly or through a switch or regulator applied to the output. A microcontroller MC2 is used to measure various values such as voltage $V_1$, current, temperature, state of charge, battery full status, end of charge, etc. and to report back to the charger to provide a closed loop system with the charger as described above. In the circuit shown in FIG. 3, the receiver MCU2 communicates back to the charger by modulating the receiver load by rapidly closing and opening a switch in series with a modulation load or impedance at a pre-determined speed and coding pattern. This rapid load modulation technique at a frequency distinct from the power transfer frequency can be easily detected by the charger. A capacitor and/or inductor can also be used as the modulation load.

As an example, if one assumes that the maximum current output of the receiver is 1000 mA and the output voltage is 5 V for a maximum output of 5 W; in this case, the minimum load resistance is 5 ohms. A modulation load resistor of several ohms (20, or 10 ohms or smaller) would be able to provide a large modulation depth signal on the receiver coil voltage. Such a large modulation can be easily detected at the charger coil current or voltage as described above. Other methods of communication through varying the reactive component of the impedance can also be used. The modulation scheme shown in FIG. 3 is shown only as a representative method and is not meant to be exhaustive. As an example, the modulation can be achieved capacitively, by replacing the resistor with a capacitor. In this instance, the modulation by the switch in the receiver provides the advantage that by choosing the modulation frequency appropriately, it is possible to achieve modulation and signal communication with the charger coil and circuitry, with minimal power loss (compared to the resistive load modulation).

The receiver in FIG. 3 also shows an optional DC regulator that is used to provide constant stable voltage to the receiver MCU2. This voltage supply may be necessary to avoid drop out of the receiver MCU2 during startup conditions where the power is varying largely or during changes in output current and also to enable the MCU2 to have a stable voltage reference source so it can measure the $V_1$ voltage accurately. Alternatively, a switch to connect or disconnect the load can be used or combined with the regulator. To avoid voltage overshoots during placement of a receiver on a charger or rapid changes in load condition, a voltage limiter circuit or elements like Transit Voltage Suppressor (TVS), Zener diodes or regulators or other voltage limiters can also be included in the receiver.

In the above description, a uni-directional communication (from the receiver to the charger) is described. However, this communication can also be bi-directional, and data can be transferred from the charger to the receiver through modulation of the voltage or current in the charger coil and read back by the microcontroller in the receiver detecting a change in the voltage or current, etc.

In accordance with an embodiment, the communication between the receiver and charger needs to follow a pre-determined protocol, baud rate, modulation depth, etc. and a pre-determined method for hand-shake, establishment of communication, and signaling, etc. as well as optionally methods for providing closed loop control and regulation of power, voltage, etc. in the receiver.

In accordance with an embodiment, a typical wireless power system operation 200 as further shown in FIG. 10 can be as follows: the charger periodically activates the charger coil driver and powers the charger coil with a drive signal of appropriate frequency. During this 'ping' process, if a receiver coil is placed on or close to the charger coil, power is received through the receiver coil and the receiver circuit is energized. The receiver microcontroller is activated by the received power and begins to perform an initiation process whereby the receiver ID, its presence, power or voltage requirements, receiver or battery temperature or state of charge, manufacturer or serial number and/or other information is sent back to the charger. If this information is verified and found to be valid, then the charger proceeds to provide continuous power to the receiver. The receiver can alternately send an end of charge, over-temperature, battery full, or other messages that will be handled appropriately by the charger and actions performed. The length of the ping process should be configured to be of sufficient length for the receiver to power up its microcontroller and to respond back and for the response to be received and understood and acted upon. The length of time between the pings can be determined by the implementation designer. If the ping process is performed often, the stand-by power use of the charger is higher. Alternately, if the ping is performed infrequently, the system will have a delay before the charger discovers a receiver nearby; so in practice, a balance should be strived for.

Alternately, the ping operation can be initiated upon discovery of a nearby receiver by other means. This provides a very low stand-by power use by the charger and may be performed by including a magnet in the receiver and a magnet sensor in the charger or through optical, capacitive, weight, NFC or Bluetooth, RFID or other RF communication or other methods for detection.

Alternatively, the system can be designed or implemented to be always ON (i.e. the charger coil is powered at an appropriate drive frequency) or pinged periodically and presence of the receiver coil brings the coil to resonance with the receiver coil and power transfer occurs. The receiver in this case may not even contain a microcontroller and act autonomously and may simply have a regulator in the receiver to provide regulated output power to a device, its skin, case, or battery. In those embodiments in which periodic pinging is performed, the presence of a receiver can be detected by measuring a higher degree of current flow or power transfer or other means and the charger can simply be kept on to continue transfer of power until either the power drawn falls below a certain level or an end of charge and/or no device present is detected.

In another embodiment, the charger may be in an OFF or standby, or low or no power condition, until a receiver is detected by means of its presence through a magnetic, RF, optical, capacitive or other methods. For example, in accordance with an embodiment the receiver can contain an RFID chip and once it is present on or nearby the charger, the charger would turn on or begin pinging to detect a receiver.

In accordance with an embodiment, the protocol used for communication can be any of, e.g., common RZ, NRZ, Manchester code, etc. used for communication. An example of the communication process and regulation of power and/or other functions is shown in FIG. 10. As described above, the charger can periodically start and apply a ping voltage of pre-determined frequency and length to the charger coil (as shown in the lower illustration in FIG. 10). The receiver is then activated, and may begin to send back communication signals as shown in top of FIG. 10. The communication signal can include an optional preamble that is used to synchronize the detection circuit in the charger and prepare it for detection of communication. A communication containing a data packet may then follow, optionally followed by checksum and parity bits, etc. Similar processes are used in communication systems and similar techniques can be followed. In accordance with an embodiment, the actual data packet can include information such as an ID code for the receiver, a manufacturer's code, received voltage, power, or current values, status of the battery, amount of power in the battery, battery or circuit temperature, end of charge or battery full signals, presence of external wired charger, or a number of the above. Also this packet may include the actual voltage, power, current, etc. value or the difference between the actual value and the desired value or some encoded value that will be useful for the charger to determine how best to regulate the output.

Alternatively, the communication signal can be a pre-determined pattern that is repetitive and simply lets the charger know that a receiver is present and/or that the receiver is a valid device within the power range of the charger, etc. Any combination of systems can be designed to provide the required performance.

In accordance with an embodiment, in response to the receiver providing information regarding output power or voltage, etc. the charger can modify voltage, frequency, duty cycle of the charger coil signal or a combination of the above. The charger can also use other techniques to modify the power out of the charger coil and to adjust the received power. Alternatively the charger can simply continue to provide power to the receiver if an approved receiver is detected and continues to be present. The charger may also monitor the current into the charger coil and/or its temperature to ensure that no extra-ordinary fault conditions exist. One example of this type of fault may be if instead of a receiver, a metal object is placed on the charger.

In accordance with an embodiment, the charger can adjust one or more parameters to increase or decrease the power or voltage in the receiver, and then wait for the receiver to provide further information before changing a parameter again, or it can use more sophisticated Proportional Integral Derivative (PID) or other control mechanism for closing the loop with the receiver and achieving output power control. Alternatively, as described above, the charger can provide a constant output power, and the receiver can regulate the power through a regulator or a charger IC or a combination of these to provide the required power to a device or battery.

Various manufacturers may use different encodings, and also bit rates and protocols. The control process used by different manufacturers or protocols may also differ, further causing interoperability problems between various chargers and receivers. A source of interoperability differences may be the size, shape, and number of turns used for the power transfer coils. Furthermore, depending on the input voltage used, the design of a wireless power system may step up or down the voltage in the receiver depending on the voltage required by a device by having appropriate number of turns in the charger and receiver coils. However, a receiver from one manufacturer may then not be able to operate on another manufacturer charger due to these differences in designs employed.

In accordance with an embodiment, it is therefore beneficial to provide a system that can operate with different receivers or chargers and can be universal. Recently, there has been some movement to standardize the frequency of operation, the coil and electronics characteristics, the identification and communication method, messaging and protocol and other aspects of the systems to allow interoperability between systems from different manufacturers. Several interoperability Standards and Specifications in this area have been established or under consideration. These include the WPC interoperability specification, the Consumer Electronics Association Standard for wireless power, the Alliance for Wireless Power (A4WP), the Consumer Electronics Association (CEA) Wireless Power Standards working group and Wireless Power Standards for Electric Vehicle charging, and other international efforts for Specification and Standards development.

The resonant frequency, F of any LC circuit is given by:

$$F = \frac{1}{2\pi\sqrt{LC}}$$

Where L is the Inductance of the circuit or coil in Henry and C is the Capacitance in Farads.

For example, in the system shown in FIG. 3, one may use the values of C1 and L1 in the above calculation for a free running charger and as a Receiver is brought close to this circuit, this value is changed by the mutual coupling of the coils involved. In the case a ferrite shield layer is used behind a coil in the charger and/or receiver, the inductance of the coil is affected by the permeability of the shield and this modified permeability should be used in the above calculation.

In accordance with an embodiment, to be able to detect and power/charge various receivers, the charger can be designed such that the initial ping signal is at such a frequency range to initially be able to power and activate the receiver circuitry in any receiver during the ping process. After this initial power up of the receiver, the charger communication circuit should be able to detect and decode the communication signal from the receiver. Many microcontrollers are able to communicate in multiple formats and/or may have different input A/D converter pins that can be configured differently to simultaneously receive the communication signal and synchronize and understand the communication at different baud rates and protocols. In accordance with an embodiment, the charger firmware can then decide on which type of receiver is present and proceed to regulate or implement what is required (end of charge, shut-off, fault condition, etc.). Depending on the message received, the charger can then decide to change the charger driver voltage amplitude, frequency, or duty cycle, or a combination of these or other parameters to provide the appropriate regulated output at the receiver output.

In accordance with an embodiment, the charger's behavior can also take into account the difference in the coil geometry, turns ratio, etc. For example, a charger and receiver pair from one or more manufacturers may require operation of the charger drive voltage at 150 kHz. However, if the same receiver is placed on a charger from another manufacturer or driven with different coil/input voltage combination, to achieve the same output power, the charger frequency may need to be 200 kHz. The charger program may detect the type of receiver placed on it and shift the frequency appropriately to achieve a baseline output power and continue regulating from there. In accordance with an embodiment, the charger can be implemented so that it is able to decode and implement multiple communication and regulation protocols and respond to them appropriately. This enables the charger to be provided as part of a multi-protocol system, and to operate with different types of receivers, technologies and manufacturers.

In accordance with another embodiment, similar techniques can be used to allow a receiver to be chargeable on chargers utilizing different protocols for communication and control. For example, the receiver may recognize the type of charger being used by deciphering the frequency of the charger operation or its ping (through frequency filtering or other techniques) and communicate using different protocols and communication signals accordingly.

For receivers that contain an onboard output stage regulator before the output power, stability of the input voltage to the regulator is not as critical since the regulator performs a smoothing function and keeps the output voltage at the desired level with any output load changes (such as during battery charging). The output of the regulator is then directed to circuitry such as power management IC (PMIC) or to a battery for charging or directly connected to the device for use (in cases where the receiver acts as a power supply to a device without internal batteries) or a combination of the above. Where an output regulator stage is used in a receiver it is critical for the wireless receiver not to exceed the maximum rated input voltage of the output stage regulator or to drop below a level required so that the output voltage from the regulator could no longer be maintained at the required value. Various types of output stage regulator such as buck, boost, buck-boost, linear etc. can be used as this output stage. However, in general, inclusion of a regulator and/or a charger IC or PMIC chip (for batteries) relaxes the power/voltage regulation requirements of the wireless power receiver portion of the circuit at the expense of the additional size and cost of this component. In accordance with some embodiments, simpler voltage limiting output stages such as Zener diodes, TVS or other voltage limiting or clamping ICs or circuits, can be used.

In accordance with another embodiment, the receiver can also include variable or switchable reactive components (capacitors and/or inductors) that allow the receiver to change its resonant condition to affect the amount of power delivered to the device, load or battery. The receiver and/or charger and/or their coils can also include elements such as thermistors, magnetic shields or magnetic cores, magnetic sensors, and input voltage filters, for safety and/or emission compliance reasons.

In accordance with an embodiment, the systems described here may use discrete electronics components or some or all of the functions described above may be integrated into an Application Specific Integrated Circuit (ASIC) or MCMs to achieve smaller footprint, better performance/noise, etc. and/or cost advantages. Such integration is common in the Electronics industry and can provide additional advantages here.

While the system above describes a system wherein the communication is primarily through the coil, as described earlier, communication can also be implemented through a separate coil, RF, optical system or a combination of the above. In such circumstances, a multi-protocol system can also be used to interoperate between systems with different communication and/or control protocols or even means of communication.

Methods for Charging Multiple Receivers from One Charger

Figure 10:
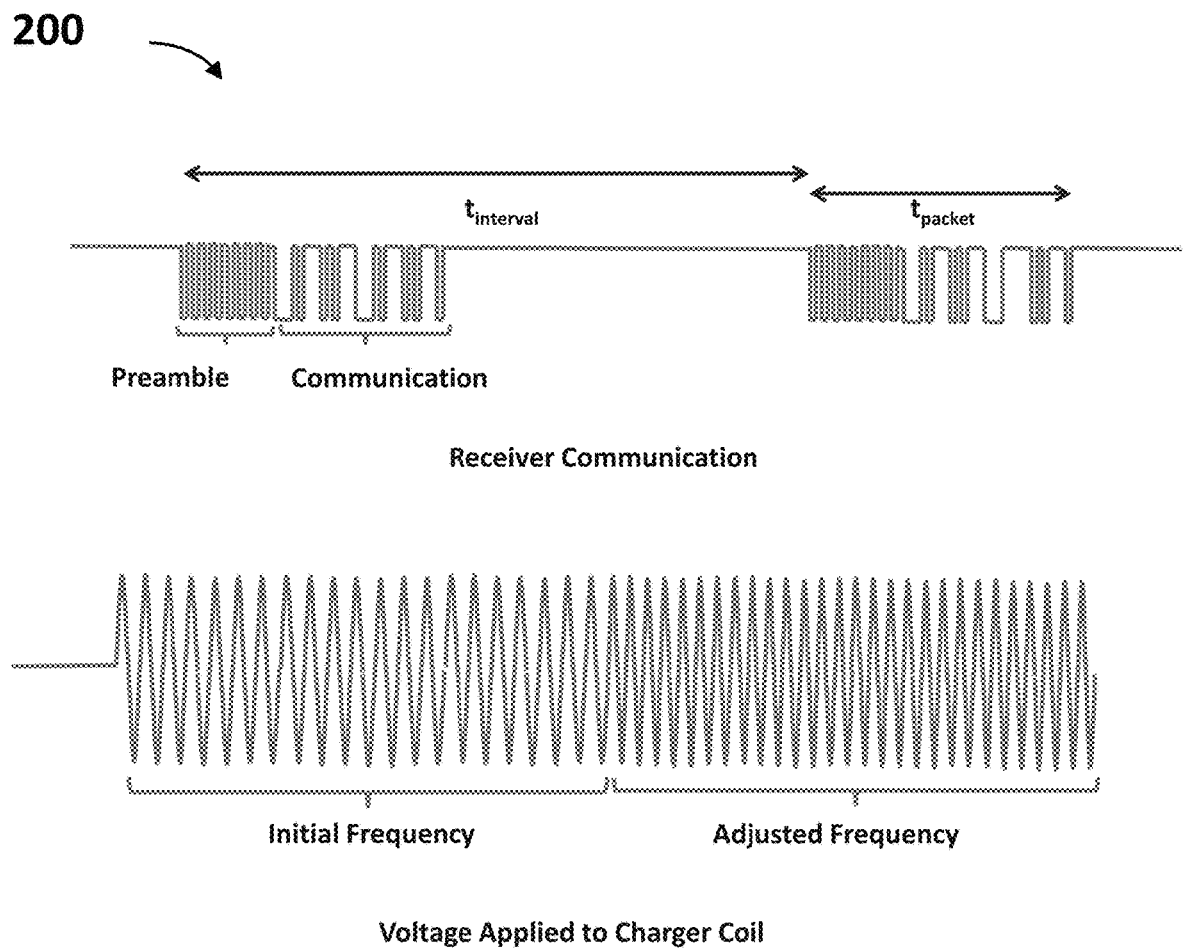
FIG. 10 illustrates the communication between a single charger and receiver, in accordance with an embodiment.
Figure 11:
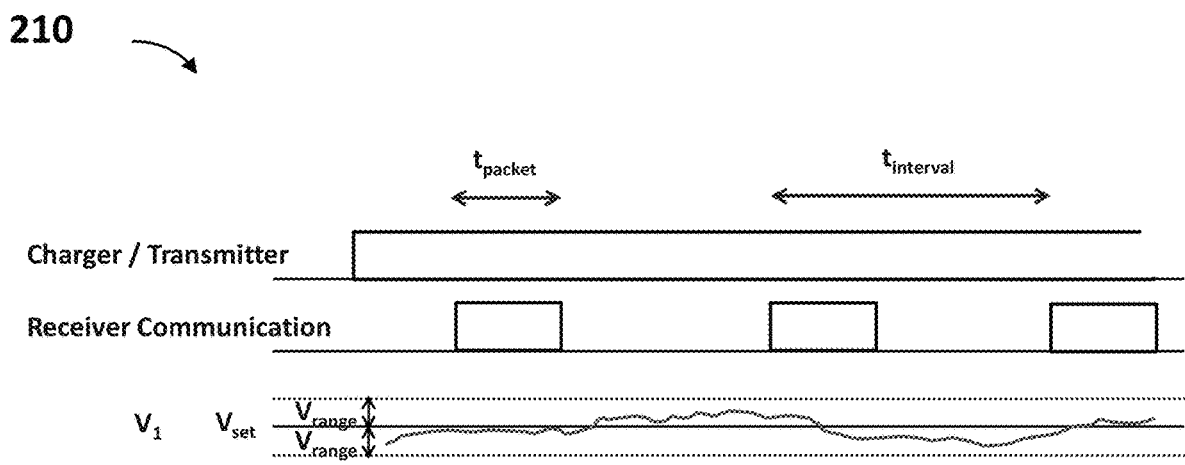
FIG. 11 further illustrates the interaction of a single charger and receiver, in accordance with an embodiment.

FIG. 10 and FIG. 11 provide more detailed views of the interaction of a single charger and receiver. The charger applies power to the receiver by generating an AC voltage across the charger coil. A receiver that is powered by this transmitter/charger coil will respond by periodically sending data packets to the charger by load modulation techniques described earlier. The data packets may have various forms and lengths. The packet length may be within some minimum ($t_{packet\ (min)}$) and maximum values ($t_{packet\ (max)}$):

$$t_{packet\ (min)} < t_{packet} < t_{packet\ (max)}$$

This data packet is repeated periodically with interval $t_{interval}$ which similarly may have a minimum and maximum allowable range of values:

$$t_{interval\ (min)} < t_{interval} < t_{interval\ (max)}$$

In response to this communication, as described earlier, the charger will change one or more parameter of operation to change the received power (or voltage $V_1$) and to bring it in within a range $V_{range}$ of the set voltage Vset:

$$V_{set} - V_{range} < V_1 < V_{set} + V_{range}$$

Some of the parameters to change to achieve the desired voltage include the charger operating frequency, the amplitude of the voltage applied to the charger circuit, and the duty cycle of the signals applied to the switching circuitry (Pulse Width Modulation: PWM).

As shown in FIG. 10, for example, the frequency of operation of operation may be modified to bring the receiver voltage or power closer to the desired or set value desired by the receiver circuit, the device connected to the receiver or the battery being charged or the system being powered.

FIG. 11 is a simplified representation 210 of the communication process between the charger and the receiver, in accordance with an embodiment. When a receiver is powered by a charger, it proceeds to send data packets of $t_{packet}$ length every $t_{interval}$ period. In general, such a system is designed for a single receiver to act as a master to provide commands to the charger to optimize power transfer to the receiver according to its needs and requirements that change over time. The output voltage $V_1$ is either the direct output to the load or in case an output voltage regulator stage is implemented the input voltage to this regulator stage (see FIGS. 3 and 9). FIG. 11 shows the variation of $V_1$ over time and its control over a range of $V_{range}$ around $V_{set}$ in accordance with an embodiment.

Figure 12:
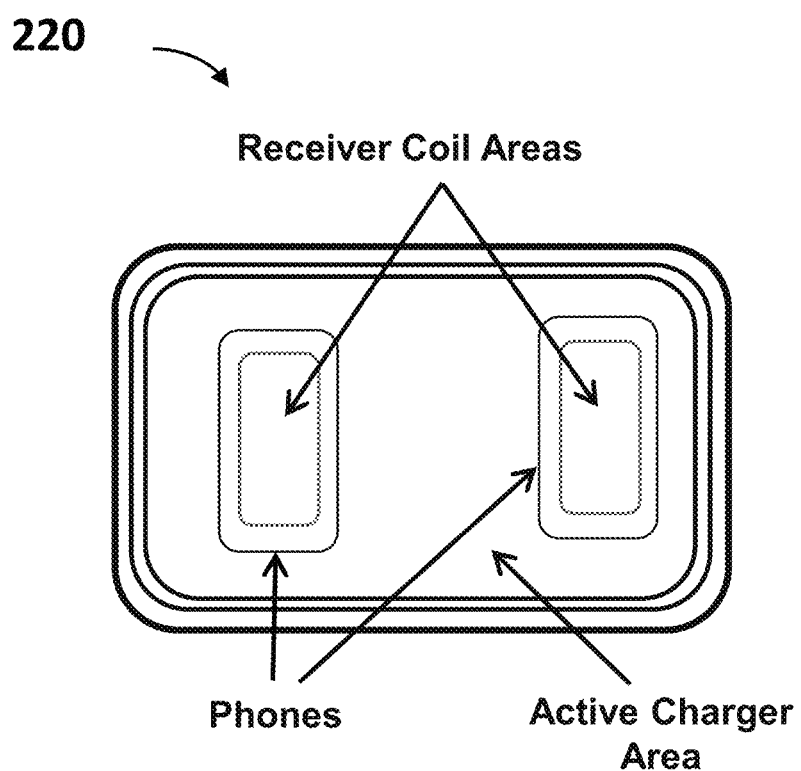
FIG. 12 illustrates use of a single coil in the charger to power or charge multiple receivers, in accordance with an embodiment.

In accordance with some embodiments, such as shown 220 in FIG. 12, where a single coil is used in the charger to power or charge multiple receivers (shown as phones in this figure, by way of example), it may be necessary to establish a method whereby simultaneous control and transfer of power to multiple receivers can be achieved.

Figure 8:
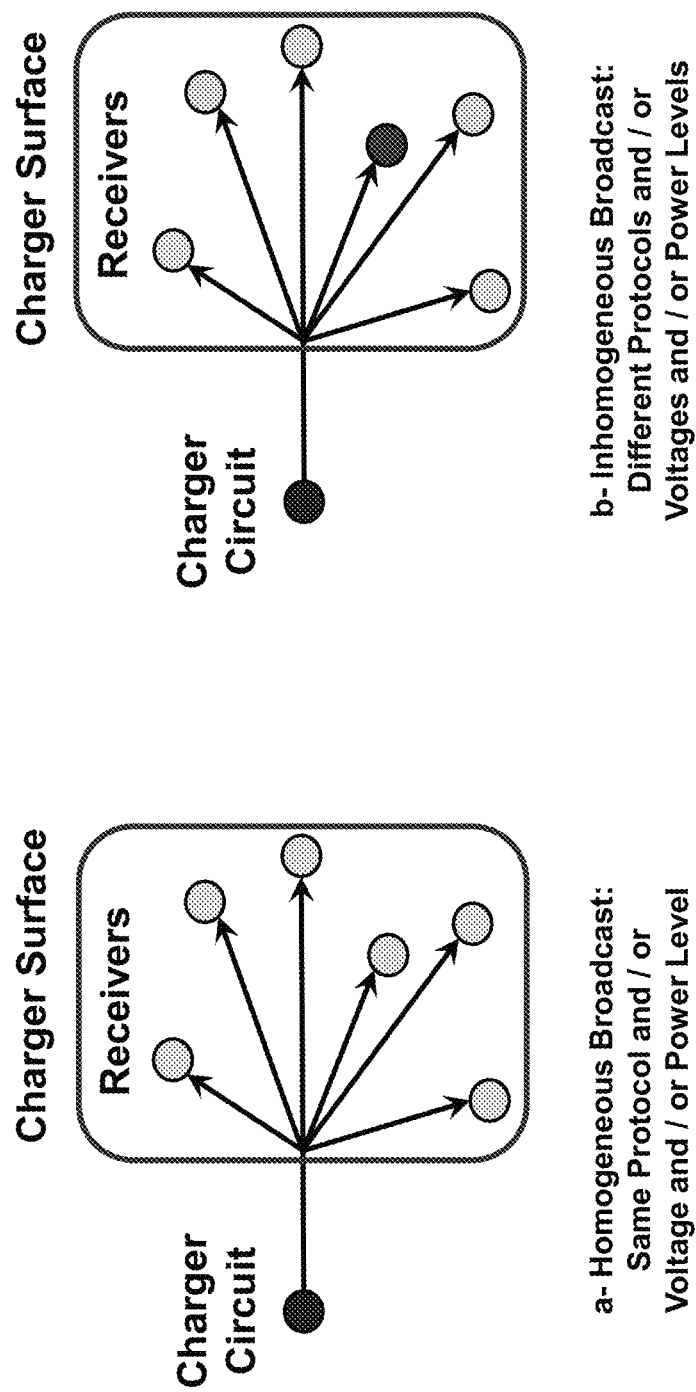
FIG. 8 illustrates a homogeneous broadcast wireless power transfer system (on the left) and an inhomogeneous broadcast wireless power transfer system (on the right), in accordance with an embodiment.

In some instances it would be beneficial to implement systems such as shown in FIGS. 8 and 12 to provide power to multiple receivers from one charger circuit and/or coil. Advantages of such systems include lower cost and complexity. As discussed previously, use of larger size charger coils and smaller receiver coils, highly resonant, Magnetic Resonance (MR), Magnetic Aperture (MA), Magnetic Aperture (MA) or Magnetic Coupling (MC), flux guiding or a combination of the above techniques can provide PPL architectures for transfer of power from one or several charger coils to one or several receiver coils. In the Physical Communication & Control Layer (PCCL), as described above, in band, load modulation or out of band communication through separate RF channel or optical or other methods of communication can be used. The receiver may communicate with the wireless charger or power supply system through the same coil the power is transferred, through a different coil, through a wireless communication protocol at a different frequency, established protocols such as Wi-Fi, Bluetooth, Zigbee, Wireless USB, etc. or a custom protocol such as WPC, A4WP, DSRC, etc. and the communication can be uni-directional (from receivers to the charger) or bi-directional.

Several issues that have to be considered in communication and control of charging to several receivers from one charger are as follows:

A PCCL and CCL system and communication protocol should be established to avoid message collision when multiple receivers are communicating with one charger.

For a charger/power supply comprising a coil that is powering multiple receivers, individual adjustment of power to different receivers by the charger is not possible. Therefore, with variation of a receiver load or during a charging cycle, received power at each individual receiver may not be adjustable or. To provide regulated output from the receivers to multiple loads, regulation at the receivers is often necessary.

Pinging, detection of multiple receivers, fault condition, over-temperature, foreign object detection (FOD) for metal, etc. can be handled for multiple receivers.

In accordance with an embodiment, described herein are several embodiments of implementing a PCCL and CCL where multiple receivers communicate with a charger/power supply using load (or impedance) modulation at the receiver. The basic operating principles of load modulation and its Physical Communication and Control Layer (PCCL) implementations for wireless power transfer (WPT) systems were described previously. Also described herein, in accordance with various embodiments, are several methods to use the PCCL described previously, or enhance it and to use more advanced Command and Control Layer (CCL) software or firmware to achieve communication and control between multiple receivers and one or more charger circuits.

Figure 13:
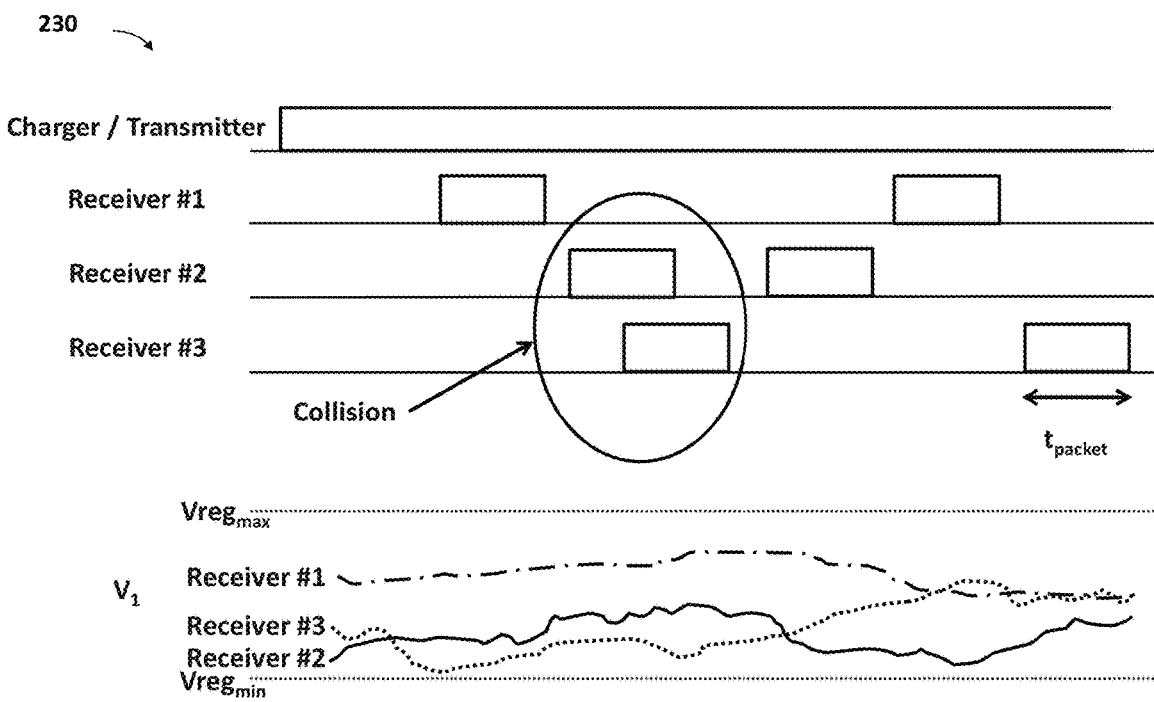
FIG. 13 illustrates transmission of data packets by the receiver at random intervals, in accordance with an embodiment.

In accordance with an embodiment, described here and shown 230 in FIG. 13, each receiver that receives power from the charger begins sending out data packets (of length $t_{packet\ (min)} < t_{packet} < t_{packet\ (max)}$) at random communication intervals ($t_{interval\ (min)} < t_{interval} < t_{interval\ (max)}$):

$$t_{packet\ (max)} < t_{interval} < t_{interval\ (max)}$$

In accordance with an embodiment, the charger detection circuit receives the communication packets from the receivers and decodes them as they arrive. However, as shown 240 in FIG. 14, there is a chance for two or more receiver packets to arrive at similar times and overlap resulting in a corrupt message as a result of such collision. The charger CCL is designed to ignore such corrupted messages and await further messages. In accordance with an embodiment, the receivers are designed to include a regulator stage at their outputs as shown in FIGS. 1, 3, and 9. These regulators and/or switches would have an input voltage operating range:

$$Vreg_{min} < V_1 < Vreg_{max}$$

Various types of output stage regulators such as buck, boost, buck-boost, linear, hysteretic, etc. can be used as this output stage. However, in general, inclusion of a regulator and/or a charger IC or PMIC chip (for batteries) relaxes the power/voltage regulation requirements of the wireless power receiver portion of the circuit (i.e. regulation of the voltage $V_1$ in FIGS. 3 & 9) at the potential expense of the additional size and cost of this output regulation component.

In accordance with some embodiments, simpler voltage limiting output stages such as Zener diodes, TVS or other voltage limiting or clamping ICs or circuits can be used. In general, to provide a wider voltage range of operation at higher efficiency, a buck regulator output stage can be used. For example for a system with a regulated 5 V output voltage, the input voltage operating range for commonly available buck Integrated Circuits (ICs) may be 6 V $<V_1<20$ V or more. Output to input power efficiencies of in excess of 90% can be obtained from available ICs.

Unlike the single charger/receiver shown in FIG. 11, in accordance with some embodiments the goal of the CCL system for a multi receiver system is not to keep the voltage level $V_1$ of the receivers within a tight limit of a set voltage. As shown in FIG. 13, in accordance with an embodiment, the charger Physical Communication and Control Layer (PCCL) system will detect and decode the received data packets and will attempt to keep all the receivers output voltages $V_1$ within their allowed operating range. This can be achieved by ensuring that the highest and lowest $V_1$ values reported by all receivers are within the allowable range. The charger can modify the input voltage to the charger coil, the operating frequency and/or the duty cycle (pulse width modulation, PWM) of the drive signal to the charger circuit to change the overall output power to the multiple receivers. The regulation stages at the output of each receiver will then convert this $V_1$ voltage to the required output voltage to the load efficiently and provide the secondary regulation necessary to achieve a constant (or variable in case of direct battery charging or programmed voltage variation) output voltage due to changing loads or receiver position conditions.

In accordance with an embodiment, such as shown in the right side of FIG. 8, each receiver may be operating to provide a different output power level or voltage. It may be therefore beneficial for each receiver to report its associated voltage $V_1$ as a relative value of its total range. For example rather than reporting the voltage value $V_1$, the receiver may report this normalized $V_{report}$ as a percentage over and under the $Vreg_{min}$ such that:

$$V_{report} = \frac{(V_1 - Vreg_{min})}{(Vreg_{max} - Vreg_{min})} * 100$$

In this way, the charger can receive an overview of status of each receiver normalized to its operating conditions and/or hardware requirements. The charger can then attempt to keep all of the reported normalized voltages within 0 to 100%.

In a further embodiment, if all of the receivers can operate within this range, the charger can then attempt to lower the overall transmitted power so that the lowest value of $V_{report}$ is close to 0 without any of the values of $V_{report}$ falling under zero. The reason for this is that the highest output regulator efficiencies are achieved with the regulator operating at the lowest input ($V_1$) operating voltage. So lowering the $V_{report}$ values to the extent possible without disrupting operation of any receivers provides an overall optimum efficiency operating condition.

In accordance with another embodiment, during ping, startup of the charger or periodically during the operation, each receiver reports its output power, voltage requirements, manufacturer and/or a unique or receiver type ID that can be converted by a look up table in the charger to recognize the receiver type and its Hardware and or Software requirements for the charger. Once the charger knows the types and numbers of the receivers present, any additional data packet would include a header that would identify to the charger which receiver is communicating at each instance and the charger would make appropriate adjustments to the overall power or take other actions depending on this data packet and knowledge of the requirements of the associated receiver.

Figure 14:
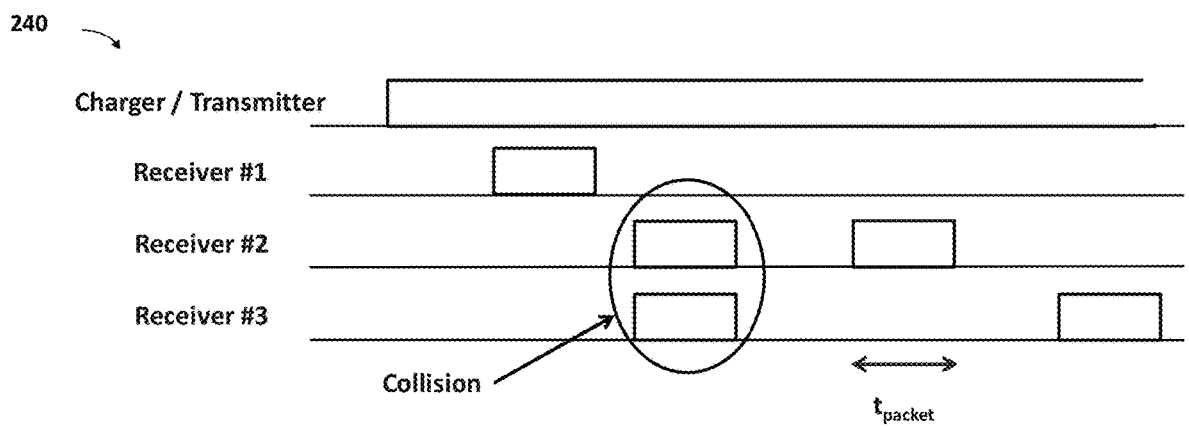
FIG. 14 illustrates timing of receiver data packets, in accordance with an embodiment.

In accordance with another embodiment, as shown in FIG. 14, a fixed $t_{packet}$ will be used by each receiver and each receiver will send its communication packet at a random delay from the last packet transmission that is a multiple N of the $t_{packet}$. In this way, there will be some more order to how often the packets arrive. However, this system will not alleviate the issue of packet collision from different receivers. Furthermore since each receiver may start communicating at a different time depending on when a receiver is placed on or near a charger, the packets can still arrive at any time with respect to each other.

Figure 15:
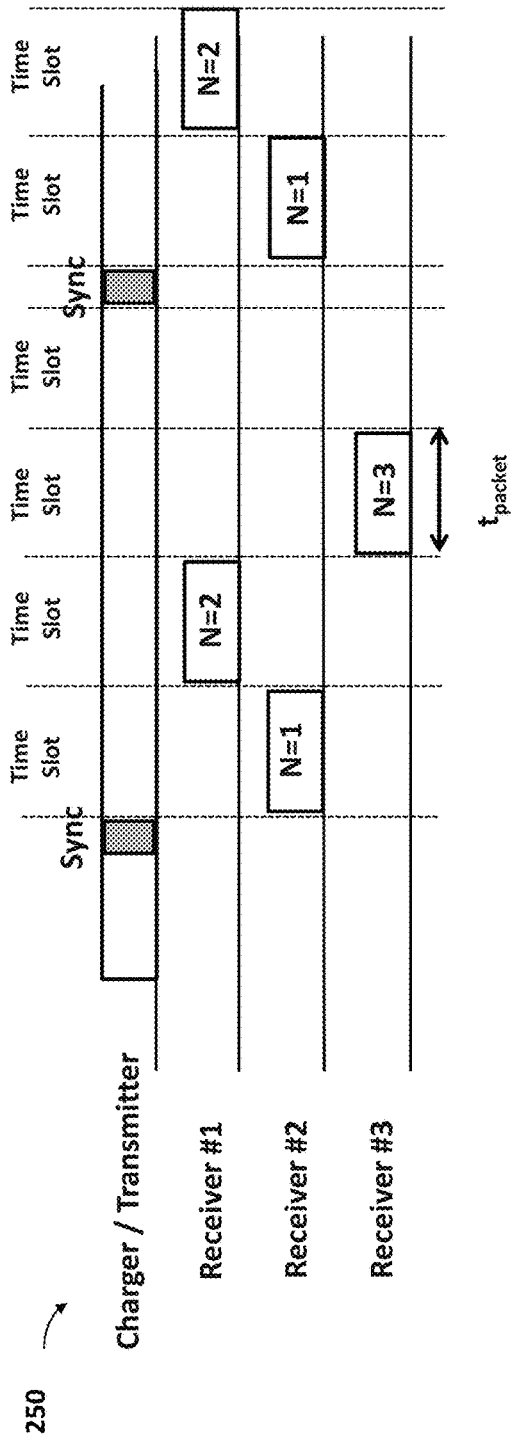
FIG. 15 illustrates how a charger may periodically transmit a sync, beacon, or query pattern, in accordance with an embodiment.

In a further embodiment, as shown 250 in FIG. 15, the charger may periodically send a sync, beacon, or query pattern that would be recognized by each receiver and used to sync their data transmission. This sync signal may also include a maximum receiver number $N_{max}$ and/or a value for a timeslot to be used. Once the sync signal has been sent, each receiver will randomly choose a number N between 1 and $N_{max}$ and begin transmission at a time window of N*timeslot and every $N_{max}$*timeslot thereafter. Alternatively the value N and timeslot may be hard coded into the charger and/or receiver systems.

Figure 16:
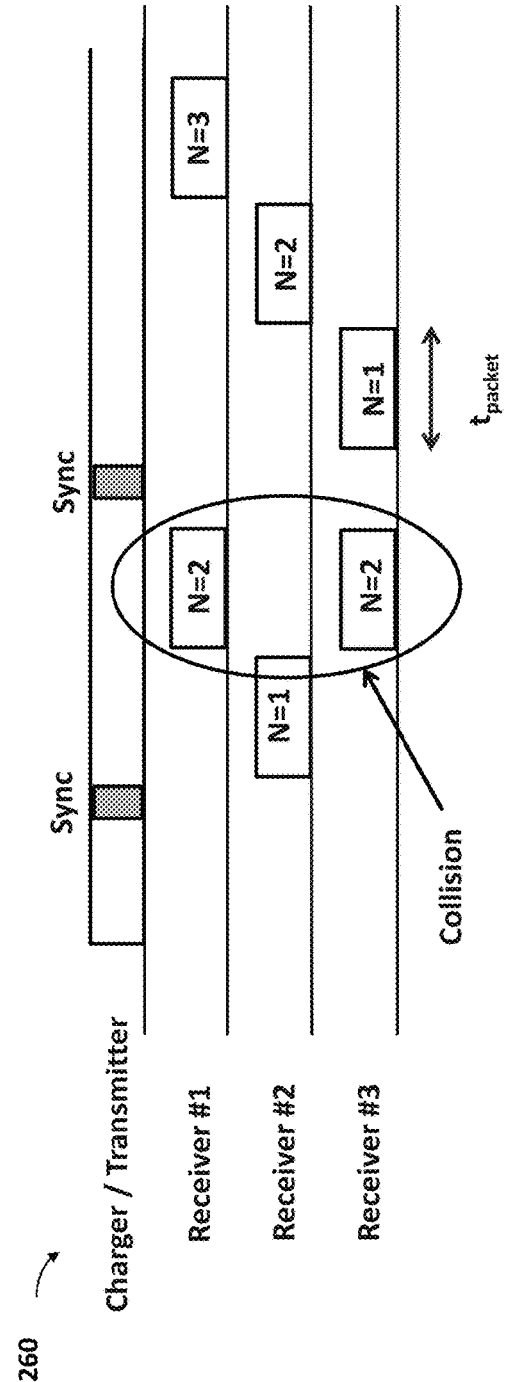
FIG. 16 illustrates data packets transmitted by multiple receivers and a collision, in accordance with an embodiment.

In accordance with an embodiment, if as shown 260 in FIG. 16, a collision occurs because two or more receivers choose the same number N, then the charger would receive a corrupted communication and would resend a sync signal to reset all receiver communication and for the receivers to pick new timeslots randomly. Additionally, to keep packet timings to keep from drifting, the charger may send periodic sync signals to the receivers whereby they adjust their timing or choose new N values. In another embodiment, the charger signal to the receivers may comprise more complex messages instructing them to reset the N values or to continue with the same N values but synchronize their timing or other commands.

Any time a new receiver is introduced to the system, it would begin drawing power and this may bring one or more receiver $V_1$ voltages rapidly below the allowed value. This may be seen as an indication to the charger of presence of a new receiver and trigger a sync signal transmission to sync all active receivers. In the above discussion several methods of powering multiple receivers from the same charger have been described but a complete wireless power transfer system should include hardware and software provisions to handle: standby and initial set up/ping or identification of receivers; changes to number of receivers due to introduction or removal of a receiver during operation; handling of changes to power requirement of one or more receivers due to movement of the receiver in X, Y, or Z direction or change in their load; end of charge at one or more receivers; foreign object (metal) detection; over temperature and/or other fault handling in the system.

Several of the above conditions are described in further detail below.

Standby and Initial Set Up/Ping or Identification of Receivers

In accordance with an embodiment, the charger periodically applies a continuous ac power to the charger coil for a period of $t_{ping}$ to seek nearby receivers. In response to this ping the nearby receivers are powered up and begin sending initialization, power apply or other messages (end of charge, fault condition, etc.). Each receiver may report its output power limit, voltage requirements, manufacturer and/or a unique or receiver type ID that can be converted by a look up table in the charger to recognize the receiver type and its Hardware and or Software requirements for the charger. Once the charger knows the types and numbers of the receivers present, any additional data packet would include a header that would identify to the charger which charger is communicating at each instance and the charger would make appropriate adjustments to the overall power or take other actions depending on this data packet and knowledge of the requirements of the associated receiver. In addition the transmitted packet would include the generated receiver power or voltage $V_1$ at that instance.

Figure 17:
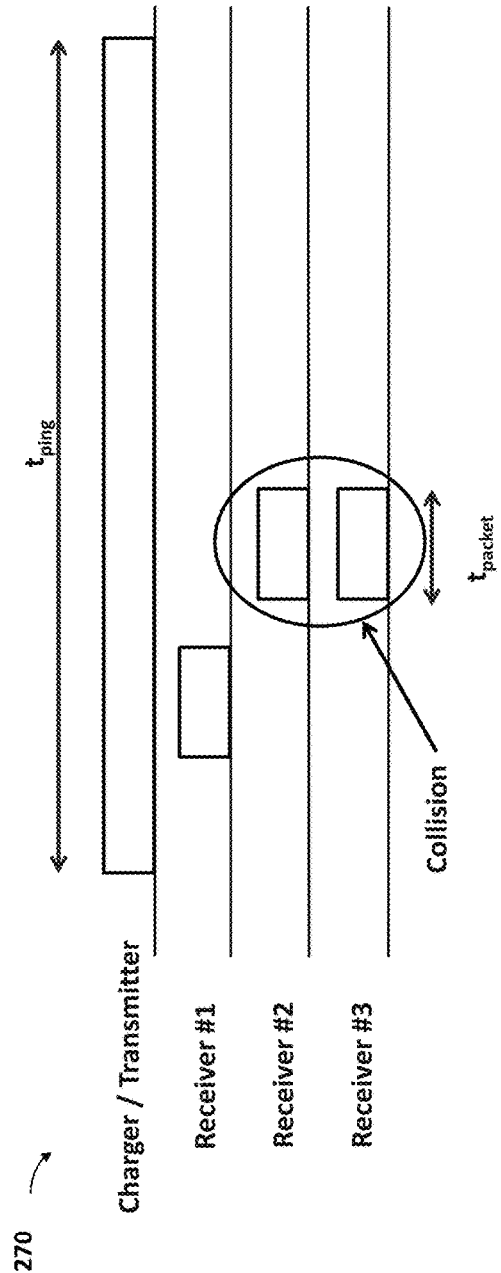
FIG. 17 illustrates where three receivers respond to a ping and begin communication transmission and a potential collision of data packets, in accordance with an embodiment.

FIG. 17 shows a situation in accordance with an embodiment 270, where three receivers respond to a ping and begin communication transmission. As shown here, it may be possible for three or more packets from different receivers to have a collision and corrupt the message received by the charger. Methods for handling collisions and to sync the transmitted messages have been described above. During the ping process the beginning of ping or a sync charger signal during ping can be used to sync the communication from the receivers present. The charger program will gather all the responses from the receivers present and determine based on the info received to progress to continuous power application or to terminate and go back to standby or ping status. Any error or fault message would terminate power application and return to standby or ping. In case of receipt of corrupted messages due to collision, the charger may terminate the ping process and reset to stand by and another ping to allow receivers to send packets again or it can proceed to send another sync signal to force the receivers to reset their message timing and send messages again or it can proceed to continuous power application based on the limited available good messages it has received and wait for further packets to determine whether to increase or decrease applied power or terminate or take other action.

In accordance with an embodiment, to deal with receivers that have different power requirements, coil types, and/or are at different X, Y, and/or Z locations and therefore different required power levels and/or frequencies to achieve required voltage levels or use different protocols or operating frequencies to respond to a ping, the frequency of the applied frequency during the ping can be varied continuously or discretely to scan and probe all possible nearby receivers. One method used may be to begin the ping at a higher frequency and move to lower frequencies in cases where the system is designed to operate at the higher frequency slope of the resonance. By moving to lower frequencies as the ping progresses, the applied power to nearby receivers is increased and any receiver that requires higher power levels is enabled eventually and would respond.

Figure 18:
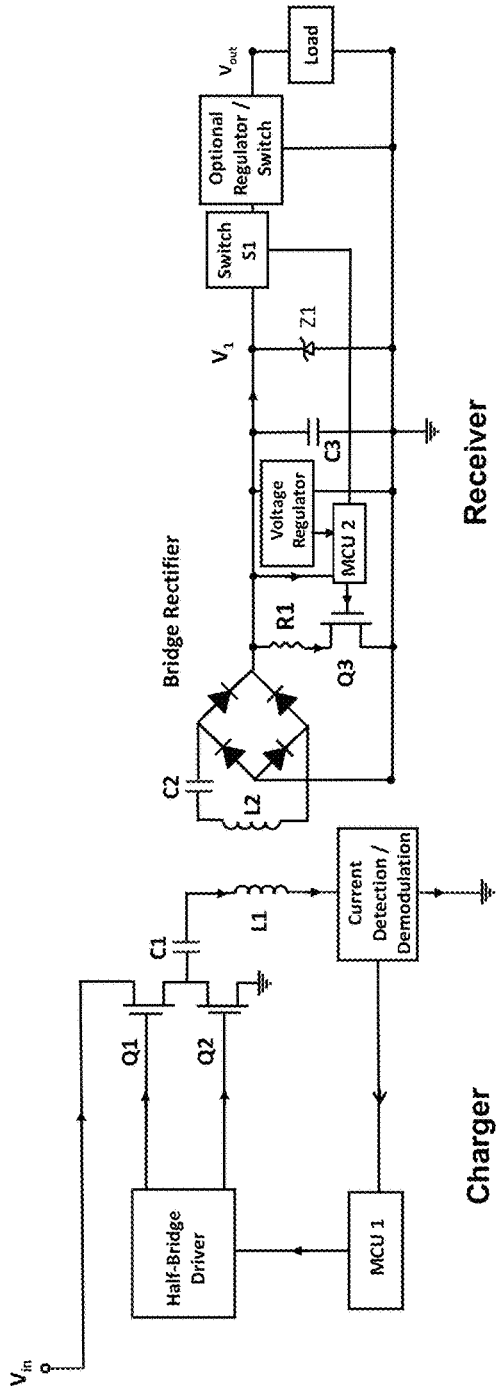
FIG. 18 illustrates use of a switch with a regulator in a receiver, in accordance with an embodiment.

In accordance with an embodiment, to avoid damage to the output regulator stages of the receivers by exceeding $Vreg_{max}$, a switch S1 may be included before the regulator, as shown 280 in FIG. 18. The switch is under receiver MCU2 control and is designed to be normally off to disconnect the rectified receiver power from the output regulator. Once a receiver is activated by a ping and communication is established, the voltage $V_1$ is regulated through charger side regulation as described earlier. Once this voltage is regulated to a safe range within the output regulator minimum and max voltage values, MCU2 can close the switch S1 and allow the output regulator to regulate the voltage to the desired output voltage level. In another embodiment or in addition to the switch discussed above, as shown in FIG. 18, a voltage limiting component such as a Transit Voltage Suppressor (TVS), Zener diode or other voltage limiter or clamp for voltage $V_1$ can also be added to quickly clamp the voltage to within safe levels.

Changes to Number of Receivers Due to Introduction/Removal During Operation

In accordance with an embodiment, during operation of the system, a user may add or remove one or more receivers operating at different output power and/or voltage levels. If the charger is in operation and transferring power to one or more receivers, addition or removal of additional receivers can result in rapid decrease or increase of receiver $V_1$ voltages due to a sudden change in the total output loading. In most circumstances, with the receivers notifying the charger about the sudden voltage change, the charger can adjust the output power level and bring the receiver $V_1$ values to within the safe range but if these values exceed safe limits, the receiver microcontroller MCU2 and a switch S1 as shown in FIG. 18 can limit damage to the output regulator. In another embodiment or in addition to the switch, as discussed earlier, a voltage limiting component such as a Transit Voltage Suppressor (TVS), Zener diode or other voltage limiter or clamp for voltage $V_1$ can be used.

Handling Changes to Power Requirements Due to Movements or Changes in Load

In accordance with an embodiment, the efficiency of the power transfer to a receiver may be affected by its location on a charger. During operation, a user may move one or more receivers in any direction. However, application of the above techniques should be sufficient to re-adjust the system to efficient operation.

End of Charge at One or More Receivers

In accordance with an embodiment, in a single charger/receiver system where the receiver output is used to charge a battery, at the completion of the charge, the output current drawn is decreased to a low limit. In this case, the charger may be instructed to shut off or enter a standby state. In addition, the user may be informed by a visual, audio or other means of notification of the end of charge by the charger and/or the receiver or the device or vehicle, etc, being charged or powered. In a multiple receiver system, when one or more of the receivers issue such an end of charge instruction, the charger may still continue to operate to power the remaining operating receivers within their required power levels. Since the devices with completed charging draw low or no power, the receiver voltage $V_1$ may increase as the current drawn is decreased. To avoid damage to the receivers some of the techniques discussed above may be implemented by integration of Switch S1 and/or voltage limiting or clamping components in the receiver.

Metal or Foreign Object Detection

In accordance with an embodiment, it may be useful in addition to the communication signal to detect the DC value of the current through the charger coil. For example, faults may be caused by insertion or presence of foreign objects such as metallic materials between the charger and receiver. These materials may be heated by the application of the power and can be detected through detection of the charger and/or receiver current or temperature or comparison of charger voltage, current, or power and receiver output voltage, current, or power and ascertaining whether the ratio is out of normal range and extra power loss due to unknown reasons is occurring. In these conditions or other situations such as abnormal charger and/or receiver heating, the charger and/or receivers may be programmed to declare a fault condition and shut down and/or alert the user or take other actions.

Over Temperature and/or Other Fault Handling

In accordance with an embodiment, in case of fault messages such as over temp, over or under voltage or power or messages due to circuit operation faults, etc. from one or more receivers, the flow of power to that receiver or the device or battery connected to it or all receivers will need to be interrupted. The PCCL and CCL implemented can support such contingency handling. For example, the charger and/or receiver may be configured to take immediate action by shutting off the charging and/or notifying the user.

Other Methods of Power Communication & Control

In accordance with another embodiment of regulation, the receivers may communicate with the charger/transmitter and/or with other receivers through wireless RF communication, RFID or Near Field Communication (NFC), Bluetooth, Wi-Fi, or other proprietary communication through separate antennas or separate coils or through optical or other methods.

Several methods of collision avoidance for wireless communication between many devices have been devised and can be applied to WPT systems. As an example, the details of the RFID specification ISO/IEC 14443-3:2011: Identification cards—Contactless integrated circuit cards—Proximity cards—Part 3: Initialization and anti-collision describes techniques to avoid collision between many devices and a reader (charger in a WPT system). Bluetooth Core Specification Ver. 4 and earlier versions refer to methods for anti-collision that can be applied to WPT PCCL as well.

In several of the embodiments described above, the charger systems are designed to provide power continuously to each receiver during operation. In accordance with another embodiment of the WPT multi receiver system described here, each receiver may time-share the transmitter power. Each receiver placed on or near a charger or transmitter may synchronize and communicate with it first. The transmitter may then power each receiver sequentially and deliver the appropriate power level through adjustment of the transmitter frequency, pulse width modulation, or adjustment of input voltage, or a combination of above methods. In order for this system to operate, it may be necessary for all or some of the receivers to disconnect from receipt of power during the time period when one receiver is receiving power. This can be accomplished by implementing and opening a switch in the path of the receiver coil circuit or disabling the receiver's output or its associated optional regulator or alike. In this way, only one receiver coil (or more depending on design and architecture) is at any given time magnetically coupled to the transmitter and receives power. After some period of time, that receiver may be disconnected by opening its appropriate switch and the next receiver powered, etc. The disadvantage of this system is that by applying power to multiple receivers in a round-robin fashion, the charge time for each device being charged is lengthened depending on the number of devices or receivers on a charger.

In accordance with an embodiment, the receivers may be communicating at any time depending on when they start their communication initially (i.e. when a receiver is placed on or near the charger surface). Thus with several receivers communicating with the charger, there is opportunity for 2 or more receivers communicating back at the same time or in a manner that their messages collide. In this case the charger may not detect and/or decipher the communicated message due to collision and corruption of the received signal. Thus the charger will not be able to react.

In the geometry described here, the charger can only act globally (transfer power to all receivers present) so that it is not possible to individually modify and manage the received power. Thus a method to regulate the power received by the device or battery to be powered or charged can be provided.

Handling of Multiple Protocols

In accordance with an embodiment, a receiver or receivers placed on or near a charger can communicate with the charger in a variety of communication protocols according to different wireless charging standards, protocols or different proprietary methods. To distinguish them and provide for efficient operation, the charger can be programmed to recognize different messages received, and operate differently.

For example, different protocols exist for communication and control for charging a single receiver placed on a charger. Some systems may require the charger to control the voltage output from the receiver coil (that is rectified and sent to an output of the system or to a regulator) within a tight tolerance, and can not tolerate a large range. An example of such a protocol or Standard is the Wireless Power Consortium (WPC) or Chi Standard which is designed to provide tight receiver coil output voltage tolerances and also requires charger frequency range of 110 to 205 kHz. In accordance with an embodiment a charger system may be designed that recognizes such a receiver and controls the output to within its target range. However, in other instances receivers may be designed as described above that can tolerate a larger $V_1$ range by using an output receiver regulator stage i to allow multi-receiver charging.

In accordance with an embodiment, to address these use cases, the charger firmware or software can be configured to recognize the presence of such receivers and operate using a different algorithm to keep one or several receiver voltage ranges to within a larger acceptable range, and provide multi-receiver charging capability. This allows one charger to be interoperable with two or more protocols and systems.

In accordance with an embodiment, the charger systems or protocols can employ different power transfer and/or communication frequencies, or different communication methods (e.g., in-band through coil, and out of band through Wi-Fi or Bluetooth or proprietary systems) to communicate and also transfer power to receivers utilizing different protocols. The approaches described herein enables interoperability between such systems.

In accordance with an embodiment, the charger may use one or more driving circuits, communication methods or protocols and/or charger power or communication coils or antennas to simultaneously power different receiver coils utilizing different protocols, standards and/or power levels or voltages.

Wirelessly Charged Battery Implementation

Figure 19:
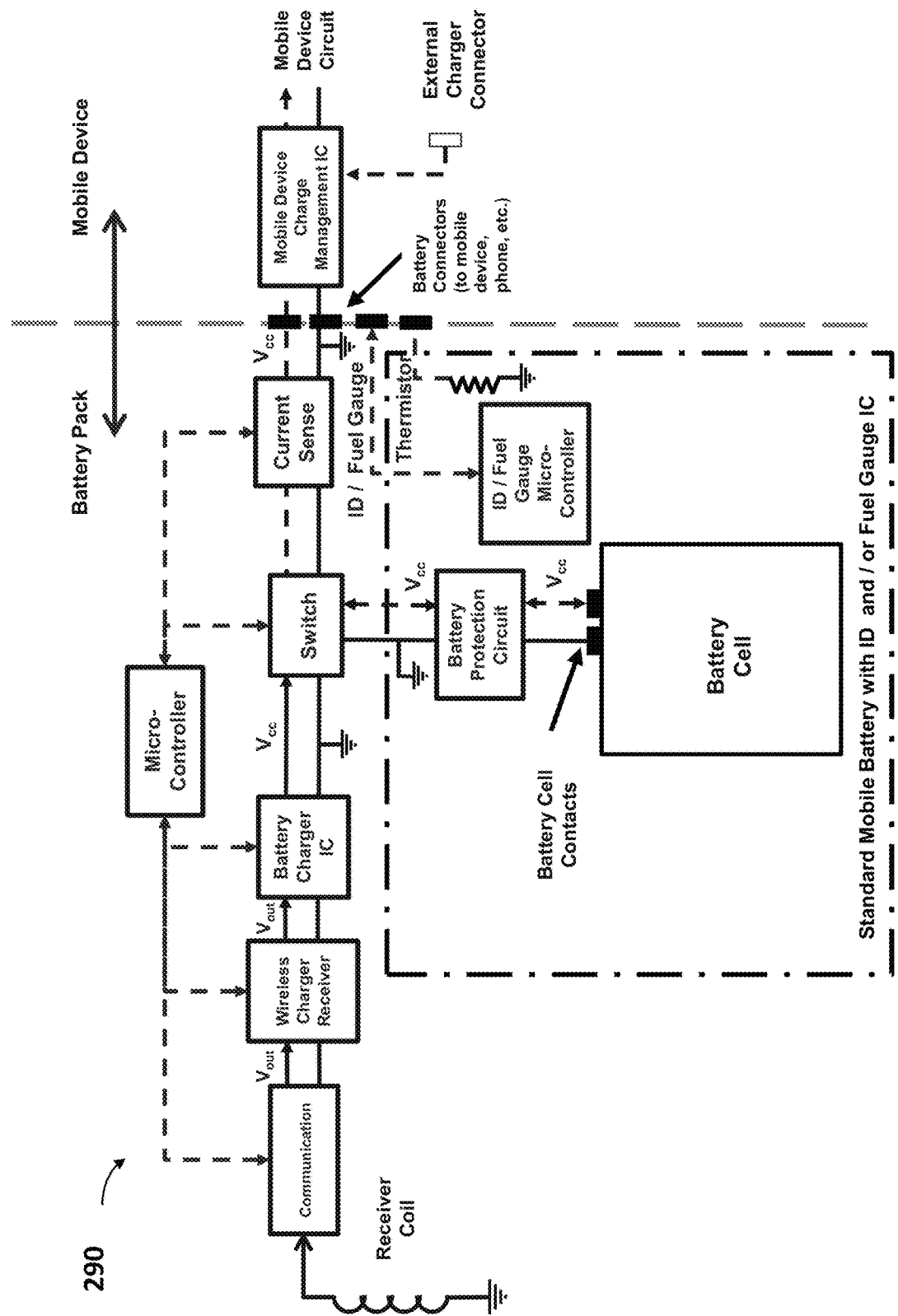
FIG. 19 illustrates a wirelessly powered battery pack and receiver, in accordance with an embodiment.

FIG. 19 shows a wirelessly powered battery pack and receiver 290, in accordance with an embodiment. The components of a typical common battery pack (battery cell and protection circuit, etc.) used in a battery device used in applications such as mobile phone, etc. are shown inside the dashed lines. The components outside the dashed lines are additional components that are included to enable safe wireless and wired charging of a battery pack. A battery pack may have four or more external connector points that interface with a mobile device pins in a battery housing or with an external typical wired charger.

Figure 20:
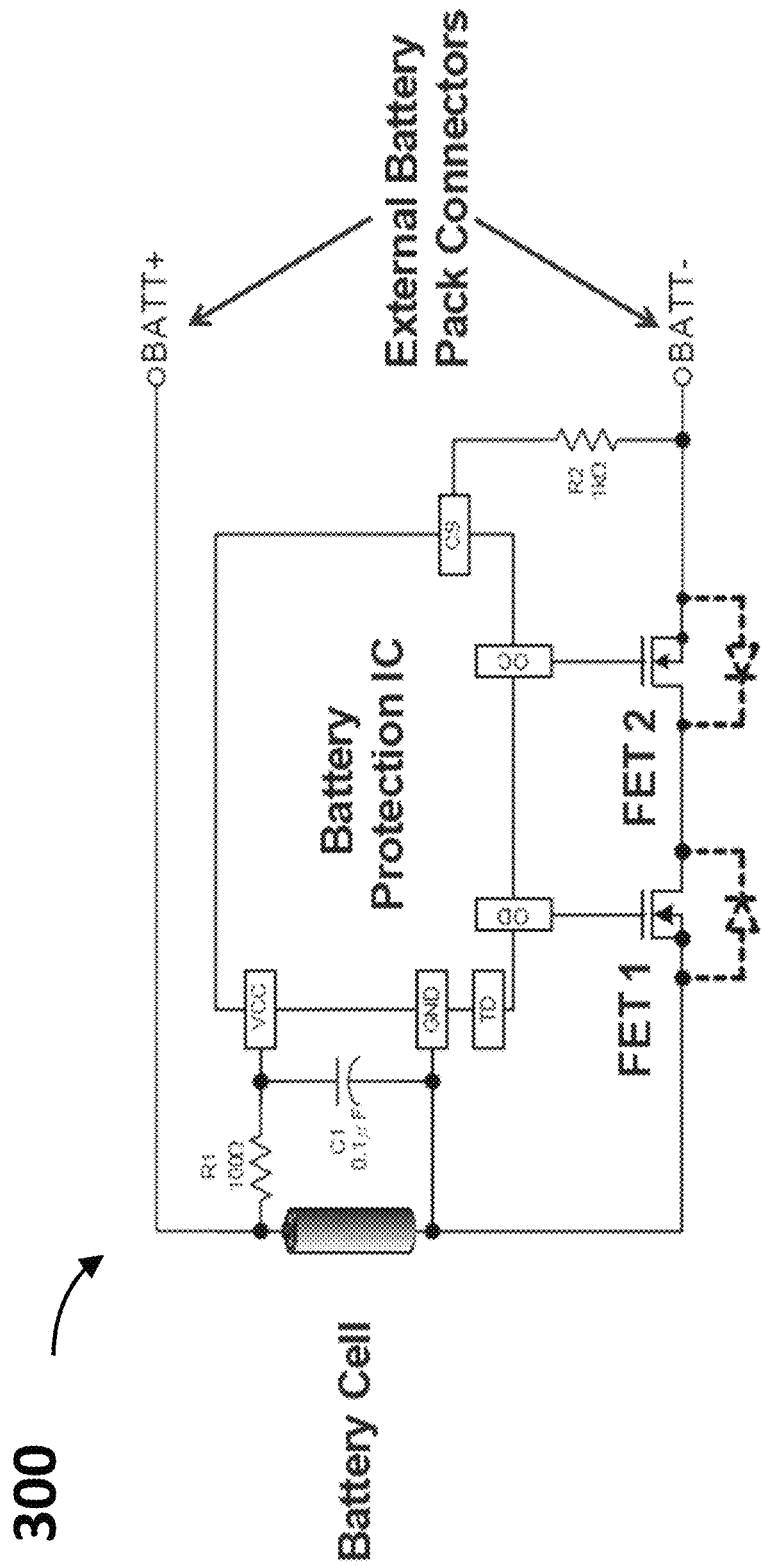
FIG. 20 illustrates a battery cell circuit, in accordance with an embodiment.

In accordance with an embodiment, the battery cell is connected as shown 300 in FIG. 20 to two of these connectors (shown in the figure as BATT+ and BATT−) through a protection circuit comprising a battery protection IC that protects a battery from over-current and under or over voltage. A typical IC can be Seiko 8241 IC that uses 2 external Field Effect Transistors (FETs) as shown in FIG. 7 to prevent current going from or to the battery cell (on the left) from the external battery pack connectors if a fault condition based on over current, or battery cell over or under voltage is detected. This provides safety during charging or discharging of the battery. In addition, a battery pack can include a PTC conductive polymer passive fuse. These devices can sense and shut off current by heating a layer inside the PTC if the amount of current passing exceeds a threshold. The PTC device is reset once this current falls and the device cools.

In addition, in accordance with an embodiment, the battery pack can contain a thermistor, which the mobile device checks through one other connector on the battery pack to monitor the health of the pack, and in some embodiments an ID chip or microcontroller that the mobile device interrogates through another connector to confirm an original battery manufacturer or other information about the battery. Other connectors and functions can be included in a battery pack to provide accurate battery status and/or charging information to a device being powered by a battery pack or a charger charging the battery pack.

In addition to the components described above, in accordance with an embodiment, the receiver circuit comprises a receiver coil that can be a wound wire and/or PCB coil as described above, optional electromagnetic shielding between the coil and the metal body of the battery, optional alignment assisting parts such as magnets, etc., a receiver communication circuit (such as the resistor and FET for load modulation shown in FIGS. 3 and 9), a wireless power receiver (such as rectifiers and capacitors as described above), and an optional Battery charger IC that has a pre-programmed battery charging algorithm. Each type of battery and chemistry requires a pre-determined optimized profile for charging of that battery type. During a typical charge cycle for a Lithium Ion (Li-Ion) battery, it can be charged up to a value of 4.2 V at full capacity. The battery should be charged according to the guidelines of the manufacturer. For a battery of capacity C, the cell can typically be charged at the rate 1 C. In Stage 1, the maximum available current is applied and the cell voltage increases until the cell voltage reaches the final value (4.2 V). In that case, the charger IC switches to Stage 2 where the charger IC switches to Constant Voltage charging where the cell voltage does not change but current is drawn from the source to further fill up the battery. This second Stage may take 1 or more hours and is necessary to fully charge the battery. Eventually, the battery will draw little (below a threshold) or no current. At this stage, the battery is full and the charger may discontinue charging. The charger IC can periodically seek the condition of the battery and top it off further if the battery has drained due to stand-by, etc.

In accordance with an embodiment, such multiple stages of battery charging can be implemented in firmware with the wireless power charger and receiver microcontrollers monitoring the battery cell voltage, current, etc. and working in tandem and to provide appropriate voltage, current, etc. for safe charging for any type of battery.

In another approach as shown in FIG. 19, a battery charger IC chip or power management unit (PMU) or Power Management Integrated Circuit (PMIC) that has specialized battery charging circuitry and algorithm for a particular type of battery can be employed. These charger ICs (with or without fuel gauge capability to accurately measure battery status, etc.) are available for different battery chemistries and are included in most mobile devices with mobile batteries such as mobile phones. They can include such safety features as a temperature sensor, open circuit shut off, etc. and can provide other circuits or microcontrollers such useful information as end of charge signal, signaling for being in constant current or voltage (stage 1 or 2 above, etc.). In addition, some of these ICs allow the user to program and set the maximum output current to the battery cell with an external resistor across 2 pins of the IC.

In accordance with an embodiment, the wirelessly charged battery pack, in addition includes a micro-controller that coordinates and monitors various points and may also include thermal sensors on the wireless power coil, battery cell and/or other points in the battery pack. The microcontroller also may communicate to the charger and can also monitor communication from the charger (in case of bi-directional communication). Typical communication through load modulation is described above.

In accordance with an embodiment, another aspect of a wirelessly charged battery pack can be an optional external/internal switch. A battery pack can receive power and be charged wirelessly or through the connectors of a battery pack. For example, when such a battery pack is used in a mobile phone, the user may wish to place the phone on a wireless charger or plug the device in to a wired charger for charging or charge the device as well as synchronize or upload and/or download data or other information. In the second case, it may be important for the battery pack to recognize current incoming to the battery pack and to take some sort of action. This action can include, e.g., notifying the user, shutting off the wired charger by a switch or simply shutting down the charger IC and sending a signal back through the microcontroller and modulating the current back to the charger that a wired charger is present (in case priority is to be given to the wired charger) or conversely to provide priority to the wireless charger and shut off wired charger access to battery when the wireless charger is charging the battery. In either case, a protocol for dealing with presence of two chargers simultaneously should be pre-established and implemented in hardware and firmware.

As shown in FIG. 19, the wireless charging of battery occurs with current flowing into the battery through the battery contacts from the mobile device. Typically, such current is provided by an external DC supply to the mobile device (such as an AC/DC adaptor for a mobile phone) and the actual charging is handled by a charger IC chip or power management IC inside the mobile device that in addition to charging the battery, measures the battery's state of charge, health, verifies battery authenticity, and displays charge status through LEDs, display, etc. to a user. It may therefore be advantageous to include a current sense circuit at one of the battery pack contacts to measure and sense the direction of current flow into or out of the battery. In situations where the current is flowing inwards (i.e. the battery is being externally charged through a wired charging connection, and/or through a mobile device), the micro-controller can take the actions described above and shut off wireless charging or conversely, provide priority to wireless charging and if it is present, allow or disallow wired charging as the implementation requires.

In many applications, it is important to include a feature that can inform a mobile device user about the state of charge of a battery pack in the device. To enable an accurate measurement of the remaining battery charge, several gas gauging techniques can be implemented, in general by incorporating a remaining charge IC or circuitry in the battery or in the device. In accordance with an embodiment, the mobile device can also include a Power PMU or PMIC or a fuel or battery gauge that communicates with the wirelessly chargeable battery and measures its degree of charge and display this status on the mobile device display or inform the user in other ways. In another embodiment, this information is transmitted to the charger and also displayed on the charger. In typical circumstances, a typical fuel gauge or PMU or PMIC may use battery voltage/impedance, etc. as well as measurement of the current and time for the current entering the mobile device (Coulomb counting) to determine the status of the battery charge. However in a wirelessly charged system, this Coulomb counting may have to be carried out in the battery rather than in the mobile device, and then communicated to the mobile device or the charger, since the charge is entering the battery directly through the onboard wireless power receiver and circuitry. The communication between the mobile device and the battery is through the connectors of the battery and may involve communication with an on-board microcontroller in the battery pack. In accordance with an embodiment, the wirelessly chargeable battery pack can include appropriate microcontroller and/or circuitry to communicate with the mobile device or wireless charger circuitry and update its state of charge, even though no current may be externally applied (through a wired power supply or charger) to the mobile device and the battery is charged wirelessly. In simpler fuel gauge techniques, the battery voltage, impedance, etc. can be used to determine battery charge status, and that in turn can be accomplished by performing appropriate measurements by the mobile device circuitry through battery connector points or by appropriate circuitry that may be incorporated in the wirelessly chargeable battery pack and/or in the mobile device or its PMU, PMIC or circuitry. FIG. 6 shows an embodiment where a microcontroller or circuit inside the battery pack is included to accomplish the fuel gauge task and report the state of charge to the device. This circuitry can be the same, or different, from an ID chip used to identify the battery and can communicate through a common battery connector or a separate one.

In accordance with an embodiment, the firmware in the receiver micro-controller plays an important role in the operation of this battery pack. The micro-controller can measure voltages and currents, flags, and temperatures at appropriate locations for proper operation. In accordance with one embodiment, by way of example, the micro-controller can measure the value of Vout from the rectifier circuit and attempt to keep this constant throughout the charging cycle thereby providing a stable regulated DC supply to the charger IC chip. The microcontroller can report the value of this voltage or error from a desired voltage (for example 5V) or simply a code for more or less power back to the charger in a binary or multi-level coding scheme through a load modulation or other scheme (for example RF communication, NFC, Bluetooth, etc. as described earlier) back to the charger. The charger can then take action through adjustment of input voltage to the charger coil, adjustment of the frequency or duty cycle of the AC voltage applied to the charger coil to bring the Vout to within required voltage range or a combination of these actions or similar methods.

The micro-controller throughout the charging process, in addition, may monitor the end of charge and/or other signals from charger and/or protection circuit and the current sense circuit (used to sense battery pack current direction and value) to take appropriate action. Li-Ion batteries for example need to be charged below a certain temperature for safety reasons. In accordance with an embodiment, it is therefore desirable to monitor the cell, wireless power receiver coil or other temperature and to take appropriate action, such as to terminate charging or lower charging current, etc. if a certain maximum temperature is exceeded.

In the example shown in FIG. 8, the battery cell voltage increases from 3 V or lower, to 4.2 V, as it is charged. The Vout of the wireless power receiver is input to a charger IC and if this Vout is kept constant (for example 5V), a large voltage drop (up to 2 V or more) can occur across this IC especially during Stage 1 where maximum current is applied. With charging currents of up to 1 A, this may translate to up to 2 Watts of wasted power/heat across this IC that may contribute to battery heating. In accordance with an embodiment, it is therefore desirable to implement a strategy whereby the Vout into the charger IC tracks the battery voltage thereby creating a smaller voltage drop and therefore loss across the charger IC. This can provide a significant improvement in performance, since thermal performance of the battery pack can be important.

User Application Layer (UAL):

In addition to the subsystems discussed earlier, a wireless power transfer system can be designed to perform additional useful functions or trigger further actions. The User Application Layer (UAL) includes the hardware, firmware and software to provide such communication and control functionalities that add such additional functionalities and usefulness.

Figure 21:
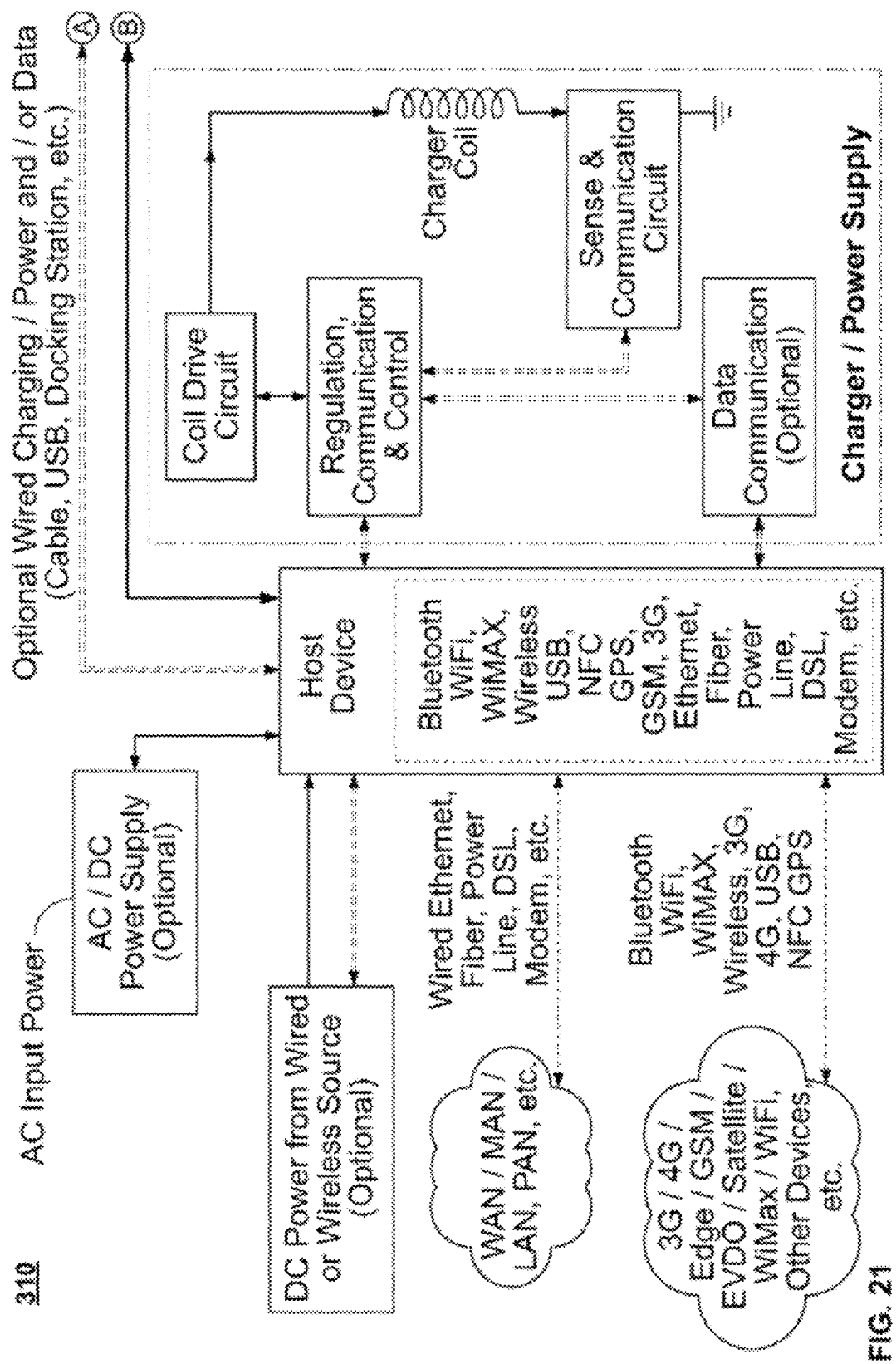
FIG. 21 illustrates the high level block diagram of a wireless power transfer system and integration of a UAL layer into a charger and receiver, in accordance with an embodiment.
Figure 21:
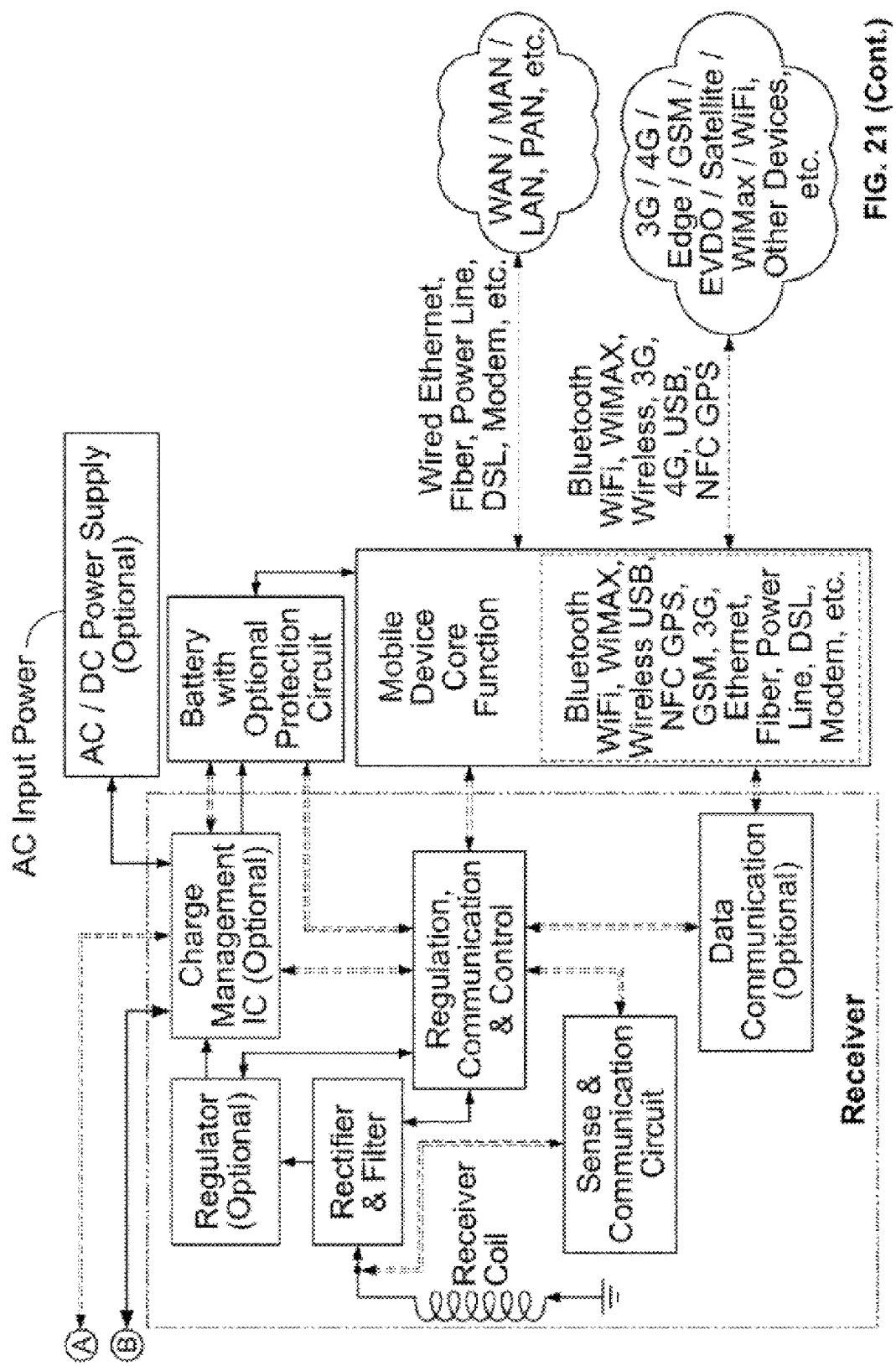

FIG. 21 shows a high level representation 310 of integration of such a UAL layer into the charger and receiver, in accordance with an embodiment. For example, the charger can be built into a car, and when a valid receiver and/or an NFC, RFID or other ID mechanism or the communication protocol in the receiver integrated into or on a mobile device, its case or skin, dongle or battery is found, the charger may activate some other functions such as Bluetooth connectivity to the device, displaying the device identity or its status or state of charge on a display or audibly, etc. More advanced functions can also be activated or enabled by placing a wireless receiver or mobile device with a wireless power receiver on a wireless charger in a car. Examples include using the device as an identification mechanism for the user and setting the temperature of the car or the driver or passenger side to the user's optimum pre-programmed temperature, setting the mirrors and seats to the preferred setting, starting a radio station or music preferred by user, etc., as described in U.S. Patent Publication No. 20110050164, which application is herein incorporated by reference.

In accordance with an embodiment, the charger/transmitter may also include an RF signal amplifier/repeater and appropriate antennas so that placement of a mobile device such as a mobile phone, tablet, etc. would provide close coupling and/or turning on of the amplifier and its antenna so that a better signal reception for communication such as cell phone calls (GSM, 3G, 4G, etc.) and/or the GPS signal can be obtained. Another example may be integration of Bluetooth, Wi-Fi, NFC or other functionality into the charger so that placement of a phone on or near a charger would trigger identification or verification of a user and launch of an application on the phone and/or the charger/automobile to perform additional functionality. An example of the receiver UAL functions may be that when a mobile device or phone is being charged or powered in a car, the mobile device and/or the charger or the car recognizes the mobile device or phone's location and automatically switches to a mode where its display and or control functions are mirrored to an in vehicle system (e.g., MirrorLink™).

Other examples include when wireless charging of a mobile device is initiated, an application in the mobile device is launched and a visual and/or audio message is shown/played back to indicate wireless charging or state of charge to the user. An example may be to connect the phone to an onboard system and antenna that would boost a signal from the phone or identify the phone and its user so that the car can travel through toll booths and a toll charged to the user's account as a car is traveling in roadways/highways. Additionally, a similar system may pay for parking in parking meters or parking structures or pay for power charging of Electric vehicle in charging stations whether these charging facilities provide wired or wireless charging. Another example may be when the charger is an EV charger and in the UAL, it is connected to a home Wi-Fi, Bluetooth, 2G, 3G, 4G, etc. wireless network, it would allow remote monitoring or control of the charging process by the user or a utility through a computer program on a computer or an application running on a mobile device such as tablet, phone, etc. Other novel uses of combination of the charging station inside the car and integration/use of advanced features can be implemented and the above descriptions are only examples. Signal Boosters that include an antenna mounted on the outside of a car, a bi-directional signal amplifier and a repeater antenna inside a car are increasingly common.

In accordance with an embodiment, the actions launched or started by setting a device on a charger can also be different in different environments. Examples can include routing a mobile phone call or music or video from a smart phone to the speakers and microphones or video monitors or TV, computer, laptop, tablet, etc. in a car, home, office, etc. Other similar actions or different actions can be provided in other environments. In yet another example, a combination speaker/Bluetooth system or a monitor or television or a combination of such can also include a wireless charger and when a mobile device such as a phone or tablet with built-in or auxiliary wireless charging receiver (such as integrated into a case or battery) is placed on the charger, it would initiate charging but would also launch applications in the charger/speaker and/or the mobile device to wireless connect or pair the two parts so that other functions may start. Examples can include playing the music on the mobile device through speakers or pictures on the mobile device played through the television, etc.

It is clear that the above discussions are as a way of describing the possibilities available through the UAL and other functionalities are possible. In general, the UAL greatly enhances the features and usefulness possible with the wireless charging and enables contextually aware charging.

In accordance with an embodiment, the firmware or the software on the charger and/or the receiver can also be updated by downloading and installation of a file or application over a wireless connection (Wi-Fi, wired connection, 3G, 4G, Bluetooth, etc.) or wired connection or installation through transfer of a file from a storage device such as an memory device (USB, HD card, etc.) or optical storage device, etc.

It can be readily appreciated that in the above descriptions many geometries and systems have been described. In practice, one or several of these systems can be used in combination in a charger and/or receivers to provide the desired performance and benefits.

In summary, the above approaches provide several important attributes that enable a multi-receiver, position-free, wireless power transfer (WPT) system to operate efficiently and safely, including:

- A magnetic coil system that allows position free multi-charging: Such performance can be achieved by taking advantage of the magnetic resonance or loosely coupled systems, flux guide (FG) structures, Magnetic Coupling (MC) or Magnetic Aperture (MA) coil and/or magnetic structures as described above.
- Design of receivers such that they include an output regulator stage that allows operation of the receiver with a larger rectified receiver coil output ($V_1$ voltage in FIGS. 3, 9 and 18 and $V_{out}$ in FIG. 19) range of voltages. This can be achieved, e.g., with output buck, boost or buck/boost regulator stages or similar geometries.
- A communication method that allows multiple receivers to communicate with a single or multiple charger circuits and avoid message collision. The above approaches generally focus on the in-band communication and/or through the coil mostly, but this can be accomplished out of band and with separate RF channel as well.
- To avoid collision in a WPT system with in-band communication or through the coil, the messages from each receiver can be sent at time intervals that are either random or different from other receivers. If a collision occurs, the charger can either ignore that message and wait for the next one, or return to ping or reset state to resynchronize the communication.
- A control algorithm for power transfer that attempts to keep all the receivers operating such that the range of the receiver voltage at its output stage regulator input is within its acceptable operating range thus allowing simultaneous operation and powering of multiple receivers.

In accordance with an embodiment, each of the attributes described above can be provided within an appropriate WPT OSI model layer described earlier. Within each layer, different aspects of the technologies may be used, depending on the particular implementation, with various elements of each of the above attributes being provided within the overall system, to provide an overall position-free efficient wireless charging system.

The above description and embodiments are not intended to be exhaustive, and are instead intended to only show some examples of the rich and varied products and technologies that can be envisioned and realized by various embodiments of the invention. It will be evident to persons skilled in the art that these and other embodiments can be combined to produce combinations of above techniques, to provide useful effects and products.

Some aspects of embodiments of the present invention can be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMS, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for powering multiple receivers inductively, the system comprising:
   a transmitter coil for transmitting power inductively to the multiple receivers; and
   a communication and control circuit electrically coupled to the transmitter coil, wherein the communication and control circuit is configured to:
      detect a plurality of communication packets that are received from the multiple receivers as a modulation of a current or voltage of the transmitter coil,
         wherein the communication packets comprise a first subset of packets received from a first receiver of the multiple receivers and a second subset of packets received from a second receiver of the multiple receivers,
         wherein the communication packets of the first subset of packets are received from the first receiver at varying intervals of time between successive communication packets,
         wherein the varying intervals of time between the successive communication packets of the first subset of packets are within a maximum interval of time and a minimum interval of time,
         wherein the communication packets of the second subset of packets are received from the second receiver at varying intervals of time between successive communication packets,
         wherein the varying intervals of time between the successive communication packets of the second subset of packets are within the maximum interval of time and the minimum interval of time,
         wherein at least some of the communication packets of the first subset of packets include information corresponding to a received power level or a voltage level at the first receiver,
         wherein at least some of the communication packets of the second subset of packets include information corresponding to a received power level or a voltage level at the second receiver; and
      in response to successfully decoding a received communication packet that includes the information corresponding to a received power level or voltage level, adjust one or more parameters of a drive signal applied to the transmitter coil to adjust the transmitted power to the multiple receivers.

2. The system of claim 1, wherein:
   the intervals of time between receipt of successive communication packets of the first subset of packets are randomized; and
   the intervals of time between receipt of successive communication packets of the second subset of packets are randomized.

3. The system of claim 1, wherein the transmitted power to each of the multiple receivers is received by a receiver coil electrically coupled to a rectifier and a smoothing capacitor, and wherein the system is further configured to adjust the parameters of the drive signal applied to the transmitter coil to change the transmitted power to the multiple receivers such that a voltage at the output of the rectifier and smoothing capacitor at each of the multiple receivers is within an acceptable range for operation of each said receiver.

4. The system of claim 1, wherein the parameters of operation of the transmitter coil to change the transmitted power to the multiple receivers include at least one of operating frequency, duty cycle, or voltage of a signal applied to the transmitter coil.

5. The system of claim 1, wherein the system is further configured to:
   transmit an initial ping to the multiple receivers, wherein the ping is used to identify at least the first receiver and the second receiver of the multiple receivers;
   detect addition of a third receiver to be powered by the transmitted power; and
   detect removal of the first receiver or the second receiver to be powered by the transmitted power.

6. A system for powering multiple receivers inductively, the system comprising:
   a transmitter coil for transmitting power inductively to the multiple receivers; and
   a communication and control circuit electrically coupled to the transmitter coil, wherein the communication and control circuit is configured to:
      modulate the transmitted power to the multiple receivers periodically at fixed time intervals to provide a synchronization signal to the multiple receivers;
      detect a plurality of communication packets that are received from the multiple receivers as a modulation of a current or voltage of the transmitter coil,
         wherein the communication packets comprise a first subset of packets received from a first receiver of the multiple receivers and a second subset of packets received from a second receiver of the multiple receivers,
         wherein the communication packets of the first subset of packets are received from the first receiver within a first fixed time slot relative to the provided synchronization signal,
         wherein the communication packets of the second subset of packets are received from the second receiver within a second fixed time slot relative to the provided synchronization signal,
         wherein at least some of the communication packets of the first subset of packets include information corresponding to a received power level or a voltage level at the first receiver,
         wherein at least some of the communication packets of the second subset of packets include information corresponding to a received power level or a voltage level at the second receiver; and in response to successfully decoding a received communication packet that includes the information corresponding to a received power level or voltage level, adjust one or more parameters of a drive signal applied to the transmitter coil to adjust the transmitted power to the multiple receivers.

7. The system of claim 6, wherein the transmitted power to each of the multiple receivers is received by a receiver coil electrically coupled to a rectifier and a smoothing capacitor, and wherein the system is further configured to adjust the parameters of the drive signal applied to the transmitter coil to change the transmitted power to the multiple receivers such that a voltage at the output of the rectifier and smoothing capacitor at each of the multiple receivers is within an acceptable range for operation of each said receiver.

8. The system of claim 6, wherein the parameters of operation of the transmitter coil to change the transmitted power to the multiple receivers include at least one of operating frequency, duty cycle, or voltage of a signal applied to the transmitter coil.

9. The system of claim 6, wherein the system is further configured to:

transmit an initial ping to the multiple receivers, wherein the ping is used to identify at least the first receiver and the second receiver of the multiple receivers;

detect addition of a third receiver to be powered by the transmitted power; and detect removal of the first receiver or the second receiver to be powered by the transmitted power.

* * * * *